US011954190B2

(12) United States Patent
Jin et al.

(10) Patent No.: US 11,954,190 B2
(45) Date of Patent: Apr. 9, 2024

(54) METHOD AND APPARATUS FOR SECURITY VERIFICATION BASED ON BIOMETRIC FEATURE

(71) Applicant: Advanced New Technologies Co., Ltd., Grand Cayman (KY)

(72) Inventors: Huifeng Jin, Shanghai (CN); Yanghui Liu, Shanghai (CN); Chao Xiu, Shanghai (CN); Liyun Dong, Shanghai (CN); Weijie Xiao, Beijing (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 1499 days.

(21) Appl. No.: 16/003,503

(22) Filed: Jun. 8, 2018

(65) Prior Publication Data

US 2018/0357401 A1 Dec. 13, 2018

(30) Foreign Application Priority Data

Jun. 9, 2017 (CN) .......................... 201710433523.9

(51) Int. Cl.
*G06F 21/32* (2013.01)
*G06Q 20/40* (2012.01)
(Continued)

(52) U.S. Cl.
CPC ....... *G06F 21/32* (2013.01); *G06Q 20/40145* (2013.01); *G06V 40/12* (2022.01);
(Continued)

(58) Field of Classification Search
None
See application file for complete search history.

(56) References Cited

U.S. PATENT DOCUMENTS 6,119,933 A 9/2000 Wong et al.
7,802,723 B2 9/2010 Petrone et al.
(Continued)

FOREIGN PATENT DOCUMENTS

CN 1164077 11/1997
CN 101201894 6/2008
(Continued)

OTHER PUBLICATIONS

Paul Gillin, "Two-Factor Authentication: A Little Goes a Long Way", Jan. 30, 2017, https://securityintelligence.com/two-factor-authentication-a-little-goes-a-long-way/ (Year: 2017).*
(Continued)

*Primary Examiner* — Ryan D Donlon
*Assistant Examiner* — Irene S Kang
(74) *Attorney, Agent, or Firm* — Fish & Richardson P.C.

(57) ABSTRACT

Biometric information is obtained from a user. A determination is made that the obtained biometric information matches at least one entry in a biometric database. In response to determining that the obtained biometric information matches the at least one entry in the biometric database, non-biometric verification information is obtained. A determination is made as to whether at least a portion of the non-biometric verification information matches at least a portion of preset non-biometric verification information associated with the user. In response to determining that the at least a portion of the non-biometric verification information matches, a determination is made that an identity of the user is verified. In response to determining that the at least a portion of the non-biometric verification information does not match, a determination is made that the identity of the user is not verified.

18 Claims, 13 Drawing Sheets

(51) Int. Cl.
  *G06V 40/12* (2022.01)
  *G06V 40/16* (2022.01)
  *H04L 9/40* (2022.01)
  *G06F 3/02* (2006.01)

(52) U.S. Cl.
  CPC .......... *G06V 40/1365* (2022.01); *G06V 40/16* (2022.01); *H04L 63/0861* (2013.01); *G06V 40/179* (2022.01); *G06V 2201/10* (2022.01)

(56) References Cited

U.S. PATENT DOCUMENTS

| | | | |
|---|---|---|---|
| 8,016,201 | B2 | 9/2011 | Beenau et al. |
| 8,913,270 | B2 | 12/2014 | Yano |
| 9,294,476 | B1 | 3/2016 | Lurey et al. |
| 9,323,912 | B2 | 4/2016 | Schultz et al. |
| 10,866,953 | B2 * | 12/2020 | Damm .............. G06F 16/24539 |
| 2002/0112177 | A1 | 8/2002 | Voltmer et al. |
| 2004/0133804 | A1 | 7/2004 | Smith et al. |
| 2006/0074986 | A1 | 4/2006 | Mallalieu et al. |
| 2007/0055517 | A1 | 3/2007 | Spector |
| 2007/0107050 | A1 | 5/2007 | Selvarajan |
| 2007/0175986 | A1 | 8/2007 | Petrone et al. |
| 2013/0051630 | A1 | 2/2013 | Marques et al. |
| 2016/0063504 | A1 | 3/2016 | Ngabonziza |
| 2017/0300911 | A1 * | 10/2017 | Alnajem .............. G06Q 20/4014 |

FOREIGN PATENT DOCUMENTS

| | | |
|---|---|---|
| CN | 2009288979 | 12/2009 |
| CN | 102646190 | 8/2012 |
| CN | 103593390 | 2/2014 |
| CN | 103942880 | 7/2014 |
| CN | 104463589 | 3/2015 |
| CN | 104574086 | 4/2015 |
| CN | 104835040 | 8/2015 |
| CN | 104853030 | 8/2015 |
| JP | 2004310667 | 11/2004 |
| JP | 2014178721 | 9/2014 |
| RU | 2438172 | 12/2011 |
| RU | 2469391 | 12/2012 |
| RU | 137838 | 2/2014 |
| WO | WO 200505275 | 1/2005 |
| WO | WO 2005052765 | 6/2005 |
| WO | WO 2017078080 | 5/2017 |
| WO | WO-2018038914 A1 * | 3/2018 ......... H04L 63/0861 |

OTHER PUBLICATIONS

PCT International Preliminary Report on Patentability in International Application No. PCT/US2018/036784, dated Sep. 16, 2019, 7 pages.

International Search Report and Written Opinion in International Application No. PCT/US2018/036784, dated Oct. 9, 2018, 13 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Chen et al., "A Fast and Elastic fingerprint matching algorithm using minutiae-centered circular regions," The Internaitonal Conference on Emerging Security, Information Systems, and Technologies (SECURE WARE 2007), Dec. 2007, 5 pages.

Ouyang, "Design and Implementation of Secure Electronic Commerce Payment System," Journal of Information Technology, Sep. 2007, 77 pages (with English abstract).

* cited by examiner

METHOD AND APPARATUS FOR SECURITY VERIFICATION BASED ON BIOMETRIC FEATURE

This application claims priority to Chinese Patent Application No. 201710433523.9, filed on Jun. 9, 2017, which is hereby incorporated by reference in its entirety.

TECHNICAL FIELD

The present invention relates to the communications field, and in particular, to a method and an apparatus for security verification based on a biometric feature.

BACKGROUND

In an information era, identification methods by using a biometric recognition technology (such as a facial recognition technology) have been widely used in many fields. For example, during network payment, a facial authentication system is used to authenticate user's facial features provided by a merchant. If authentication succeeds, security code is returned to the merchant, so that the merchant can use the security code to make an order in an ordering system and complete the payment. However, the current biometric recognition technology (such as the facial recognition technology) is still unable to accurately recognize a person, that is, a user cannot be accurately determined by using collected facial features only. As a result, one part of the facial features can match N (N>1) clients in a database.

To resolve this problem in the current technical design, the user needs to enter a mobile number. The facial features are used for initial verification and the mobile number entered by the user is used for further verification of the user's identity. Although this method can accurately locate a user, the method is relatively complex for the user and the user experience is poor.

SUMMARY

The purpose of embodiments of the present application is to provide a method and an apparatus for security verification based on a biometric feature in order to achieve accurate and efficient security verification based on the biometric feature.

To resolve the previous technical problem, the embodiments of the present application are implemented as follows:

In one aspect, an embodiment of the present application provides a method for security verification based on a biometric feature, including: receiving a security verification request, and obtaining biometric information of a pending verification party according to the security verification request; matching the obtained biometric information against a pre-generated biometric database including a plurality of biometric information, to determine whether the biometric database includes the obtained biometric information; and determining that the pending verification party passes verification when the biometric database includes the obtained biometric information.

Optionally, determining that the pending verification party passes verification when the biometric database includes the obtained biometric information includes: when the biometric database includes the obtained biometric information, receiving pending verification information entered by the pending verification party, where the pending verification information is a part of predetermined information associated with the pending verification party and has a length less than or equal to a total length of the predetermined information; and verifying the pending verification information, and when the pending verification information passes verification, determining that the pending verification parity passes verification.

Optionally, when the biometric database includes the obtained biometric information, the method further includes: outputting prompt information used to prompt the pending verification party to enter the pending verification information.

Optionally, the biometric information includes at least a facial feature, iris, or fingerprint.

Optionally, the predetermined information includes at least one of a communications number, an ID card number, or a name; and the pending verification information includes at least one of the following in the predetermined information: information at a designated location; information with a designated length; or information with a designated length starting from a designated location.

Optionally, the method further includes: when the biometric database does not include the obtained biometric information, matching the obtained biometric information against a global biometric database, which includes a large amount of biometric information, to determine whether the global biometric database includes the obtained biometric information, where the biometric information in the global biometric database is more than the biometric information in the biometric database; and determining that the pending verification party passes verification when the global biometric database includes the obtained biometric information; or determining that the pending verification party fails to pass verification when the global biometric database does not include the obtained biometric information.

In another aspect, an embodiment of the present application provides a method for secure payment based on a biometric feature, including: receiving a secure payment request for paying network money to a recipient, and obtaining biometric information of a buyer according to the secure payment request; matching the obtained biometric information against a pre-generated biometric database including a plurality of biometric information, to determine whether the biometric database includes the obtained biometric information; determining that the buyer passes verification when the biometric database includes the obtained biometric information; and paying the network money to the recipient according to the secure payment request.

Optionally, the determining that the buyer passes verification when the biometric database includes the obtained biometric information includes: when the biometric database includes the obtained biometric information, receiving pending verification information entered by the buyer, where the pending verification information is a part of predetermined information associated with the buyer and has a length less than or equal to a total length of the predetermined information; and verifying the pending verification information, and when the pending verification information passes verification, determining that the buyer passes verification.

Optionally, the biometric information includes at least a facial feature, iris, or fingerprint.

Optionally, the predetermined information includes at least one of a communications number, an ID card number, or a name; and the pending verification information includes at least one of the following in the predetermined information: information at a designated location; information with a designated length; or information with a designated length starting from a designated location.

Optionally, the method further includes: when the biometric database does not include the obtained biometric information, matching the obtained biometric information against a global biometric database, which includes a large amount of biometric information, to determine whether the global biometric database includes the obtained biometric information, where the biometric information in the global biometric database is more than the biometric information in the biometric database; and determining that the buyer passes verification when the global biometric database includes the obtained biometric information; or determining that the buyer fails to pass verification when the global biometric database does not include the obtained biometric information.

Optionally, the biometric database corresponds to additional information; the secure payment request includes the additional information; and the matching the obtained biometric information against a predetermined biometric database including a plurality of biometric information includes: determining and obtaining a target biometric database corresponding to the additional information from a plurality of biometric databases; and matching the obtained biometric information against the target biometric database.

Optionally, the additional information includes at least one of the following: merchant information corresponding to the recipient; or geographical location information of the buyer.

Optionally, when the additional information includes the merchant information corresponding to the recipient, the target biometric database is a biometric database corresponding to the merchant information; and correspondingly, the biometric database is generated according to the following steps: obtaining a plurality of historical buyers corresponding to the merchant information when a request for generating a biometric database is received, where the generation request carries the merchant information; for the plurality of historical buyers, determining whether each historical buyer satisfies a first predetermined condition, and selecting a historical buyer who satisfies the first predetermined condition as a first buyer, where the first predetermined condition includes at least one of the following: a transaction quantity with the recipient reaches a first predetermined quantity; or a transaction frequency with the recipient reaches a first predetermined frequency; obtaining biometric information corresponding to each first buyer; and collecting the biometric information of the first buyers, and generating the biometric database corresponding to the merchant information.

Optionally, when the additional information includes the geographical location information of the buyer, the target biometric database is a biometric database corresponding to the geographical location information; and correspondingly, the biometric database is generated according to the following steps: obtaining a plurality of historical buyers corresponding to the geographical location information of the buyer when a request for generating a biometric database is received, where the generation request carries the geographical location information; for the plurality of historical buyers, determining whether each historical buyer satisfies a second predetermined condition, and selecting a historical buyer who satisfies the second predetermined condition as a second buyer, where the second predetermined condition includes at least one of the following: a transaction quantity reaches a second predetermined quantity; or a transaction frequency reaches a second predetermined frequency; obtaining biometric information corresponding to each second buyer; and collecting the biometric information of the second buyers, and generating the biometric database corresponding to the geographical location information.

In still another aspect, an embodiment of the present application provides an apparatus for security verification based on a biometric feature, including: a first acquisition module, configured to receive a security verification request, and obtain biometric information of a pending verification party according to the security verification request; a first match module, configured to match the obtained biometric information against a pre-generated biometric database including a plurality of biometric information, to determine whether the biometric database includes the obtained biometric information; and a first determining module, configured to determine that the pending verification party passes verification when the biometric database includes the obtained biometric information.

Optionally, the first determining module includes: a first receiving unit, configured to: when the biometric database includes the obtained biometric information, receive pending verification information entered by the pending verification party, where the pending verification information is a part of predetermined information associated with the pending verification party and has a length less than or equal to a total length of the predetermined information; and a first determining unit, configured to verify the pending verification information, and when the pending verification information passes verification, determine that the buyer passes verification.

Optionally, the first determining module further includes: an output unit, configured to: when the biometric database includes the obtained biometric information, output prompt information used to prompt the pending verification party to enter the pending verification information.

Optionally, the biometric information includes at least a facial feature, iris, or fingerprint.

Optionally, the predetermined information includes at least one of a communications number, an ID card number, or a name; and the pending verification information includes at least one of the following in the predetermined information: information at a designated location; information with a designated length; or information with a designated length starting from a designated location.

Optionally, the apparatus further includes: a second match module, configured to: when the biometric database does not include the obtained biometric information, match the obtained biometric information against a global biometric database, which includes a large amount of biometric information, to determine whether the global biometric database includes the obtained biometric information, where the biometric information in the global biometric database is more than the biometric information in the biometric database; a second determining module, configured to determine that the pending verification party passes verification when the global biometric database includes the obtained biometric information; and a third determining module, configured to determine that the pending verification party fails to pass verification when the global biometric database does not include the obtained biometric information.

In still another aspect, an embodiment of the present application provides an apparatus for secure payment based on a biometric feature, including: a second acquisition module, configured to receive a secure payment request for paying network money to a recipient, and obtain biometric information of a buyer according to the secure payment request; a third match module, configured to match the obtained biometric information against a pre-generated biometric database including a plurality of biometric information, to determine whether the biometric database includes the obtained biometric information; a fourth determining module, configured to determine that the buyer passes verification when the biometric database includes the obtained biometric information; and a payment module, configured to pay the network money to the recipient according to the secure payment request.

Optionally, the fourth determining module includes: a second receiving unit, configured to: when the biometric database includes the obtained biometric information, receive pending verification information entered by the buyer, where the pending verification information is a part of predetermined information associated with the buyer and has a length less than or equal to a total length of the predetermined information; and a second determining unit, configured to verify the pending verification information, and when the pending verification information passes verification, determine that the buyer passes verification.

Optionally, the biometric information includes at least a facial feature, iris, or fingerprint.

Optionally, the predetermined information includes at least one of a communications number, an ID card number, or a name; and the pending verification information includes at least one of the following in the predetermined information: information at a designated location; information with a designated length; or information with a designated length starting from a designated location.

Optionally, the apparatus further includes: a fourth match module, configured to: when the biometric database does not include the obtained biometric information, match the obtained biometric information against a global biometric database, which includes a large amount of biometric information, to determine whether the global biometric database includes the obtained biometric information, where the biometric information in the global biometric database is more than the biometric information in the biometric database; a fifth determining module, configured to determine that the buyer passes verification when the global biometric database includes the obtained biometric information; and a sixth determining module, configured to determine that the buyer fails to pass verification when the global biometric database does not include the obtained biometric information.

Optionally, the biometric database corresponds to additional information; the secure payment request includes the additional information; and the third match module includes: an acquisition unit, configured to determine and obtain a target biometric database corresponding to the additional information from a plurality of biometric databases; and a match unit, configured to match the recognized biometric information against the target biometric database.

Optionally, the additional information includes at least one of the following: merchant information corresponding to the recipient; or geographical location information of the buyer.

Optionally, when the additional information includes the merchant information corresponding to the recipient, the target biometric database is a biometric database corresponding to the merchant information; and correspondingly, the apparatus further includes a first generation module, configured to: obtain a plurality of historical buyers corresponding to the merchant information when a request for generating a biometric database is received, where the generation request carries the merchant information; for the plurality of historical buyers, determine whether each historical buyer satisfies a first predetermined condition, and select a historical buyer who satisfies the first predetermined condition as a first buyer, where the first predetermined condition includes at least one of the following: a transaction quantity with the recipient reaches a first predetermined quantity; or a transaction frequency with the recipient reaches a first predetermined frequency; obtain biometric information corresponding to each first buyer; and collect the biometric information of the first buyers, and generate the biometric database corresponding to the merchant information.

Optionally, when the additional information includes the geographical location information of the buyer, the target biometric database is a biometric database corresponding to the geographical location information; and correspondingly, the apparatus further includes a second generation module, configured to: obtain a plurality of historical buyers corresponding to the geographical location information of the buyer when a request for generating a biometric database is received, where the generation request carries the geographical location information; for the plurality of historical buyers, determine whether each historical buyer satisfies a second predetermined condition, and select a historical buyer who satisfies the second predetermined condition as a second buyer, where the second predetermined condition includes at least one of the following: a transaction quantity reaches a second predetermined quantity; or a transaction frequency reaches a second predetermined frequency; obtain biometric information corresponding to each second buyer; and collect the biometric information of the second buyers, and generate the biometric database corresponding to the geographical location information.

In still another aspect, an embodiment of the present application provides an apparatus for security verification based on a biometric feature, including: a processor; and a memory configured to store a computer executable instruction, where when executing the executable instruction, the processor is configured to: receive a security verification request, and obtain biometric information of a pending verification party according to the security verification request; match the obtained biometric information against a pre-generated biometric database including a plurality of biometric information, to determine whether the biometric database includes the obtained biometric information; and determine that the pending verification party passes verification when the biometric database includes the obtained biometric information.

In still another aspect, an embodiment of the present application provides an apparatus for secure payment based on a biometric feature, including: a processor; and a memory configured to store a computer executable instruction, where when executing the executable instruction, the processor is configured to: receive a secure payment request for paying network money to a recipient, and obtain biometric information of a buyer according to the secure payment request; match the obtained biometric information against a pre-generated biometric database including a plurality of biometric information, to determine whether the biometric database includes the obtained biometric information; determine that the buyer passes verification when the biometric database includes the obtained biometric information; and pay the network money to the recipient according to the secure payment request.

According to the technical solutions in the embodiments of the present invention, when the security verification request is received, the biometric information of the pending verification party is obtained according to the security verification request. The obtained biometric information is matched against the pre-generated biometric database including a plurality of biometric information. When a match result is that the biometric database includes the obtained biometric information, it is determined that the pending verification party passes verification. In view of this, in the technical solutions, the biometric information of the pending verification party is matched against the biometric database, and whether the pending verification party passes verification is determined according to the match result. When security verification is performed on the pending verification party, there is no need to make a comparison with the global biometric database, which includes a large amount of biometric information, so that verification time can be shortened, and efficiency and accuracy of security verification can be significantly improved.

Further, in the technical solutions, when the biometric database includes the obtained biometric information, the pending verification information entered by the pending verification party is received. The pending verification information is a part of predetermined information associated with the pending verification party and has a length less than or equal to a total length of the predetermined information. Then the pending verification information is verified. When the pending verification information passes verification, it is determined that the pending verification party passes verification. When the length of the pending verification information is equal to the total length of the predetermined information, in the technical solutions, the biometric information of the pending verification information and the entered pending verification information are verified sequentially, and accuracy of the security verification greatly improves. When the length of the pending verification information is less than the total length of the predetermined information, in the technical solutions, in addition to the greatly improved accuracy of the security verification, the pending verification party only needs to enter a small part of information to complete the security verification, so that the pending verification party can manually enter less content, and the user experience can be improved.

BRIEF DESCRIPTION OF DRAWINGS

To describe the technical solutions in the embodiments of the present application or in the existing technology more clearly, the following briefly introduces the accompanying drawings required for describing the embodiments or the existing technology. Apparently, the accompanying drawings in the following description show some embodiments of the present application, and a person of ordinary skill in the art can still derive other drawings from these accompanying drawings without creative efforts.

DESCRIPTION OF EMBODIMENTS

Embodiments of the present application provide a method and an apparatus for security verification based on a biometric feature to implement accurate and efficient security verification based on the biometric feature.

To make a person skilled in the art understand the technical solutions in the present application better, the following clearly and completely describes the technical solutions in the embodiments of the present invention with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
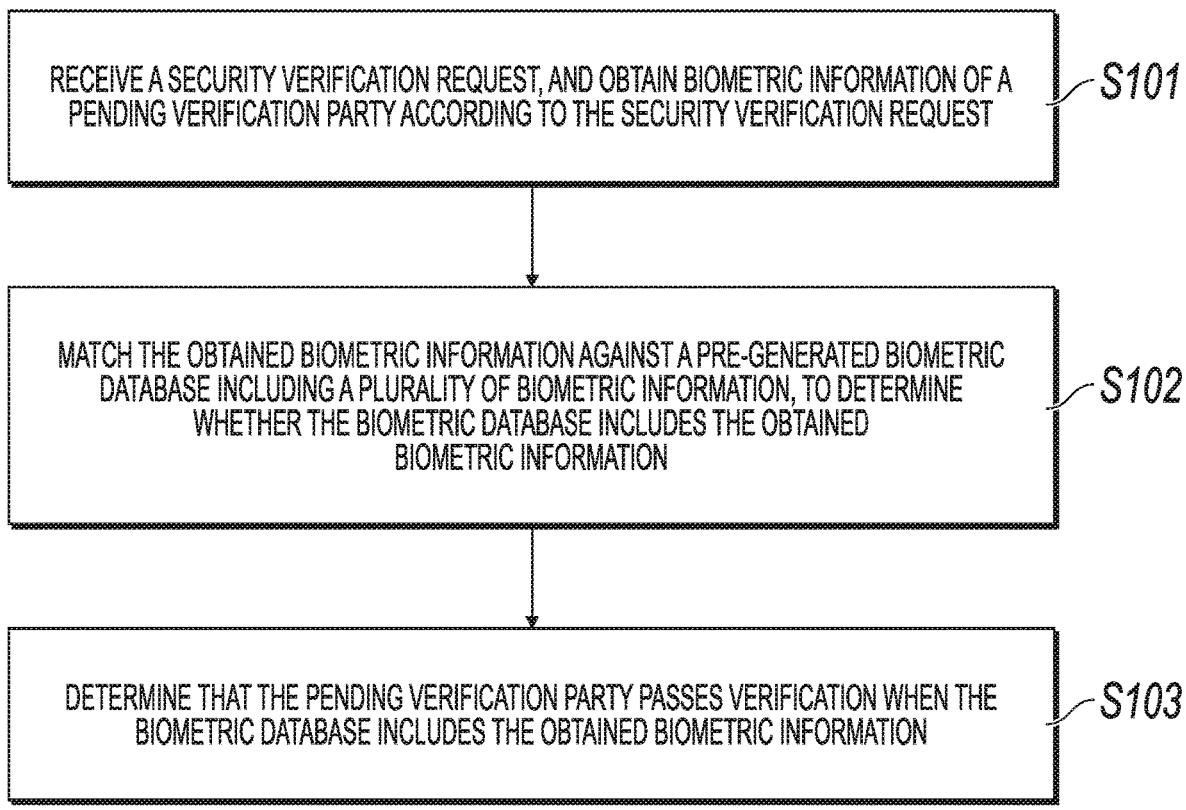
FIG. 1 is a schematic flowchart of a method for security verification based on a biometric feature according to an embodiment of the present invention.

FIG. 1 is a schematic flowchart of a method for security verification based on a biometric feature according to an embodiment of the present invention. As shown in FIG. 1, the method includes steps S101 to S103.

Step S101: Receive a security verification request, and obtain biometric information of a pending verification party according to the security verification request.

The biometric information includes at least a facial feature, iris, or fingerprint. The security verification request can be triggered by the pending verification party proactively, or can be triggered in other situations. For example, the security verification request can be triggered when a request of a designated type (such as a secure payment request or an entrance guard removal request) is received.

Step S102: Match the obtained biometric information against a pre-generated biometric database including a plurality of biometric information, to determine whether the biometric database includes the obtained biometric information.

Step S103: Determine that the pending verification party passes verification when the biometric database includes the obtained biometric information.

In this embodiment, the biometric database includes less biometric information than a global biometric database, which includes a large amount of biometric information. Therefore, the biometric information of the pending verification party is matched against the biometric database, and whether the pending verification party passes verification is determined according to a match result. When security verification is performed on the pending verification party, there is no need to make a comparison with the global biometric database, which includes a large amount of biometric information, so that verification time can be shortened, and efficiency and accuracy of security verification can be significantly improved.

Figure 2:
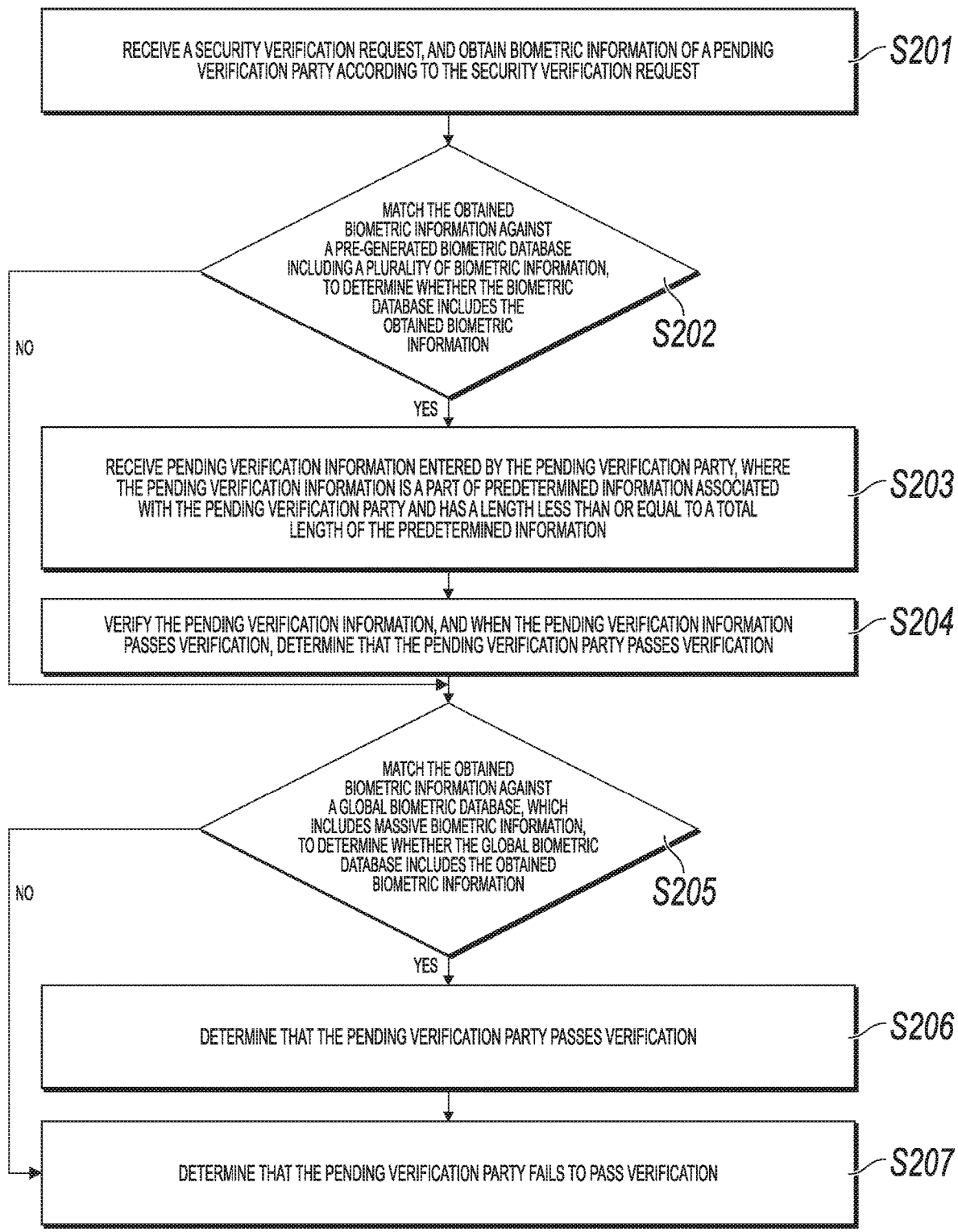
FIG. 2 is a schematic flowchart of a method for security verification based on a biometric feature according to another embodiment of the present invention.

FIG. 2 is a schematic flowchart of a method for security verification based on a biometric feature according to another embodiment of the present invention. As shown in FIG. 2, the method includes steps S201 to S207.

Step S201: Receive a security verification request, and obtain biometric information of a pending verification party according to the security verification request.

The biometric information includes at least a facial feature, iris, or fingerprint. The security verification request can be triggered by the pending verification party proactively, or can be triggered in other situations. For example, the security verification request can be triggered when a request of a designated type (such as a secure payment request or an entrance guard removal request) is received.

Step S202: Match the obtained biometric information against a pre-generated biometric database including a plurality of biometric information, to determine whether the biometric database includes the obtained biometric information. When the biometric database includes the obtained biometric information, perform step S203; when the biometric database does not include the obtained biometric information, perform step S205.

Step S203: Receive pending verification information entered by the pending verification party, where the pending verification information is a part of predetermined information associated with the pending verification party and has a length less than or equal to a total length of the predetermined information.

The predetermined information includes at least one of a communications number, an ID card number, or a name. The pending verification information includes at least one of the following in the predetermined information: information at a designated location, information with a designated length, or information with a designated length starting from a designated location.

A plurality of presentation forms of the pending verification information are described below by using an example.

(1) The pending verification information includes information at a designated location in the predetermined information. For example, the pending verification information is 8th to 11th digits of an ID card number, or 2nd to 6th digits of a communications number.

(2) The pending verification information includes information with a designated length in the predetermined information. For example, the pending verification information is an 11-digit communications number, or a 4-letter name.

(3) The pending verification information includes information with a designated length starting from a designated location in the predetermined information. For example, the pending verification information is five digits starting from a 2nd digit of an ID card number, or four digits starting from an 8th digit of a communications number (last four digits of the communication number).

In an embodiment, when the biometric database includes the obtained biometric information, an input box used to enter pending verification information can pop up in a current terminal interface. The input box can be at any location in the current terminal interface, or can be at a floating layer popping up above the current terminal interface.

In addition, when the input box pops up, prompt information used to prompt the pending verification party to enter the pending verification information can be output. An output method of the prompt information can include voice output, text output, etc. For example, when the prompt information is output by using the voice output method, the input box is provided and at the same time, "Please enter last four digits of your communications number" is prompted by a voice command. When the prompt information is output by using the text output method, the input box is provided and at the same time, "Last four digits of your communications number" is displayed in the current terminal interface.

Step S204: Verify the pending verification information, and when the pending verification information passes verification, determine that the pending verification parity passes verification.

Step S205: Match the obtained biometric information against a global biometric database, which includes a large amount of biometric information, to determine whether the global biometric database includes the obtained biometric information. When the global biometric database includes the obtained biometric information, perform step S206; when the global biometric database does not include the obtained biometric information, perform step S207.

The biometric information in the global biometric database is more than the biometric information in the biometric database.

Step S206: Determine that the pending verification party passes verification.

Step S207: Determine that the pending verification party fails to pass verification.

In addition, after step S205 is performed, if the global biometric database includes the obtained biometric information, pending verification information entered by the pending verification party can be further received. The pending verification information is a part of predetermined information associated with the pending verification party and has a length less than or equal to a total length of the predetermined information. Therefore, a purpose of improving security verification accuracy can be achieved.

In the technical solution in this embodiment, when the biometric database includes the obtained biometric information, the pending verification information entered by the pending verification party is received. The pending verification information is a part of predetermined information associated with the pending verification party and has a length less than or equal to a total length of the predetermined information. Then the pending verification information is verified. When the pending verification information passes verification, it is determined that the pending verification party passes verification. When the length of the pending verification information is equal to the total length of the predetermined information, in the technical solution, the biometric information of the pending verification information and the entered pending verification information are verified sequentially, and accuracy of the security verification greatly improves. When the length of the pending verification information is less than the total length of the predetermined information, in the technical solution, in addition to the greatly improved accuracy of the security verification, the pending verification party only needs to enter a small part of information to complete the security verification, so that the pending verification party can manually enter less content, and the user experience can be improved.

The method for security verification based on the biometric feature according to this embodiment can be used in many scenarios, such as security verification of a buyer during secure payment or security verification of an incoming person when an entrance guard needs to be removed.

In the previous embodiment, the pre-generated biometric database corresponds to additional information. The security verification request includes the additional information. Therefore, when step S102 is performed, a target biometric database corresponding to the additional information can be first determined and obtained from a plurality of biometric databases, and then the obtained biometric information is matched against the target biometric database.

In an embodiment, the biometric database can be generated according to the following steps:

Step 1: Obtain a plurality of historical pending verification parties corresponding to additional information when a request for generating a biometric database is received, where the generation request carries the additional information.

Additional information varies in different scenarios. For example, the additional information can be merchant information corresponding to a verifying party who is used to verify the pending verification party, geographical location information of the verifying party, geographical location information of the pending verification party, etc.

Historical pending verification parties vary with the additional information. Specifically, when the additional information is the merchant information corresponding to the verifying party who is used to verify the pending verification party, the plurality of historical pending verification parties corresponding to the additional information are pending verification parties who have completed verifications with the verifying party (such as a recipient). When the additional information is the geographical location information of the verifying party or the geographical location information of the pending verification party, the plurality of historical pending verification parties corresponding to the additional information are pending verification parties that reside in a region corresponding to the geographical location information.

Step 2: For the plurality of historical pending verification parties, determine whether each historical pending verification party satisfies a predetermined condition, and select a historical pending verification party who satisfies the predetermined condition as a pending verification party.

The predetermined condition can include at least one of the following: a quantity of verifications completed with the verifying party reaches a predetermined quantity, a frequency of verifications with the verifying party reaches a predetermined frequency, a success rate of verifications with the verifying party reaches a predetermined success rate, etc.

Step 3: Obtain biometric information corresponding to each pending verification party. The biometric information can be information indicative of a biometric feature, such as a facial feature, an iris feature, or a fingerprint feature.

Step 4: Collect the biometric information of the pending verification parties, and generate the biometric database corresponding to the additional information.

When the previous method is applied to different scenarios, a method for generating the biometric database varies with the additional information carried in the security verification request. Processes for generating the biometric database in different scenarios are described by using different embodiments.

Scenario one: Security verification of a buyer during secure payment.

In this scenario, the pending verification party is a buyer. The security verification request can be (or include) a secure payment request for paying network money to the buyer. The additional information can include at least one of the following: merchant information corresponding to a recipient, or geographical location information of the buyer.

In an embodiment, when the additional information includes the merchant information corresponding to the recipient, the target biometric database is a biometric database corresponding to the merchant information. In this case, the biometric database can be generated according to steps A0 to A3.

Step A0: Obtain a plurality of historical buyers corresponding to merchant information when a request for generating a biometric database is received, where the generation request carries the merchant information.

The plurality of historical buyers corresponding to the merchant information are a plurality of historical buyers who have made transactions with the recipient corresponding to the merchant information.

Step A1: For the plurality of historical buyers, determine whether each historical buyer satisfies a predetermined condition, and select a historical buyer who satisfies the predetermined condition as a first buyer.

The predetermined condition can include one or a combination of the following: a transaction quantity with the recipient reaches a first predetermined quantity, or a transaction frequency with the recipient reaches a first predetermined frequency.

Step A2: Obtain biometric information corresponding to each first buyer. The biometric information can be information indicative of a biometric feature, such as a facial feature, an iris feature, or a fingerprint feature.

Step A3: Collect the biometric information of the first buyers, and generate the biometric database corresponding to the merchant information.

For example, for a recipient X, transaction information (such as a transaction quantity between each buyer and the recipient X, transaction time, or a transaction value each time) of all buyers who have made transactions with the recipient X is collected to make statistics. A first buyer is selected from the buyers according to the transaction information. The first buyer is a buyer who has made transactions, with the recipient X, whose quantity reaches the first predetermined quantity (such as 100 transactions) and whose frequency reaches the first predetermined frequency (more than 10 transactions each month).

It should be noted that the condition that the first buyer needs to satisfy is not limited to the enumerated conditions in step A1, and can be another condition used to select a buyer, such as a buyer who has made frequent transactions recently, or a transaction value reaches a specific threshold.

After the first buyer is selected, the biometric information corresponding to each first buyer is obtained. Then, the biometric information corresponding to the first buyers is collected to generate the biometric database corresponding to the merchant information of the recipient X.

In another embodiment, when the additional information includes the geographical location information of the buyer, the target biometric database is a biometric database corresponding to the geographical location information. In this case, the biometric database can be generated according to steps B0 to B3.

Step B0: Obtain a plurality of historical buyers corresponding to geographical location information of the buyer when a request for generating a biometric database is received, where the generation request carries the geographical location information.

The geographical location information can be presented in a form of a region. The plurality of historical buyers corresponding to the geographical location information are a plurality of historical buyers who reside in a region corresponding to the geographical location information. Because division is performed according to the geographical location information in this embodiment, all users in a same region who have made network transactions are historical buyers in this region.

Step B1: For the plurality of historical buyers, determine whether each historical buyer satisfies a predetermined condition, and select a historical buyer who satisfies the predetermined condition as a second buyer.

The predetermined condition can include one or a combination of the following: a transaction quantity reaches a second predetermined quantity, or a transaction frequency reaches a second predetermined frequency.

The geographical location information can be presented in a form of a region. The plurality of buyers corresponding to the geographical location information are a plurality of buyers who reside in a region corresponding to the geographical location information. Because division is performed according to the geographical location information in this embodiment, all users in a same region who have made network transactions are buyers in this region.

Step B2: Obtain biometric information corresponding to each second buyer. The biometric information can be information indicative of a biometric feature, such as a facial feature, an iris feature, or a fingerprint feature.

Step B3: Collect the biometric information of the second buyers, and generate the biometric database corresponding to the geographical location information.

In this embodiment, the region corresponding to the geographical location information can be obtained through division according to various criteria, such as a building, a street, or a floor area.

For example, according to a building, the region corresponding to the geographical location information can be a district A, a district B, a school C, a hospital D . . . . For the district A, transaction information (such as a transaction quantity of each buyer who has made network transactions, transaction time, or a transaction value each time) of all buyers who reside in the district A is collected to make statistics. A second buyer is selected from the buyers according to the transaction information. The second buyer is a buyer who has made transactions whose quantity reaches the second predetermined quantity (such as 800 transactions) and whose frequency reaches the second predetermined frequency (more than 20 transactions each month).

It should be noted that the condition that the second buyer needs to satisfy is not limited to the enumerated conditions in step B1, and can be another condition used to select a buyer, such as a buyer who has made frequent transactions recently, or a transaction value reaches a specific threshold.

After the second buyer is selected, the biometric information corresponding to each second buyer is obtained. Then the biometric information corresponding to the second buyers is collected to generate the biometric database corresponding to the district A.

Scenario two: Security verification of an incoming person when an entrance guard needs to be removed.

In this scenario, the pending verification party is an entrance guard removal party. When the additional information can include geographical location information of a door, the target biometric database is a biometric database corresponding to the geographical location information. In this case, the biometric database can be generated according to steps C0 to C3.

Step C0: Obtain a plurality of historical entrance guard removal parties corresponding to geographical location information of a door when a request for generating a biometric database is received, where the generation request carries the geographical location information.

The geographical location information can be presented in a form of a region. The plurality of historical entrance guard removal parties corresponding to the geographical location information are a plurality of historical entrance guard removal parties who reside in a region corresponding to the geographical location information. Because division is performed according to the geographical location information in this embodiment, all users in a same region are historical entrance guard removal parties in this region.

Step C1: For the plurality of historical entrance guard removal parties, determine whether each historical entrance guard removal party satisfies a predetermined condition, and select a historical entrance guard removal party who satisfies the predetermined condition as an entrance guard removal party.

The predetermined condition can include one or a combination of the following: an entrance guard removal quantity reaches a third predetermined quantity, or an entrance guard removal frequency reaches a third predetermined frequency.

Step C2: Obtain biometric information corresponding to each entrance guard removal party. The biometric information can be information indicative of a biometric feature, such as a facial feature, an iris feature, or a fingerprint feature.

Step C3: Collect the biometric information of the entrance guard removal parties, and generate the biometric database corresponding to the geographical location information.

In this embodiment, the region corresponding to the geographical location information can be obtained through division according to various criteria, such as a building, a street, or a floor area. When division is performed according to a building, division can be further performed according to criteria such as a house number and a building number.

For example, according to a building, the region corresponding to the geographical location information can be a district E, a district F, a district G . . . . For the district E, entrance guard removal information (such as an entrance guard removal quantity and entrance guard removal time of each user) of all users who reside in the district E is collected to make statistics. An entrance guard removal party is selected from the users according to the entrance guard removal information. The entrance guard removal party is a user who has removed an entrance guard at a frequency that reaches the third predetermined frequency (such as removing the entrance guard twice a day).

After the entrance guard removal party is selected, the biometric information corresponding to each entrance guard removal party is obtained. Then the biometric information corresponding to the entrance guard removal parties is collected to generate the biometric database corresponding to the district E.

It can be seen from this embodiment that, the biometric information included in the biometric database is far less than biometric information included in a global biometric database. Therefore, in this technical solution, the biometric information of the pending verification party is matched against the biometric database, and whether the pending verification party passes verification is determined according to a match result. When security verification is performed on the pending verification party, there is no need to make a comparison with the global biometric database, which includes a large amount of biometric information, so that verification time can be shortened, and efficiency and accuracy of security verification can be significantly improved.

After the biometric database is generated, the method for security verification based on the biometric feature according to the present invention can be used to perform security verification. The following describes in detail that the method for security verification based on the biometric feature is applied to a secure payment scenario. Other scenarios are similar to specific implementations in the secure payment scenario, and details are not described.

Figure 3:
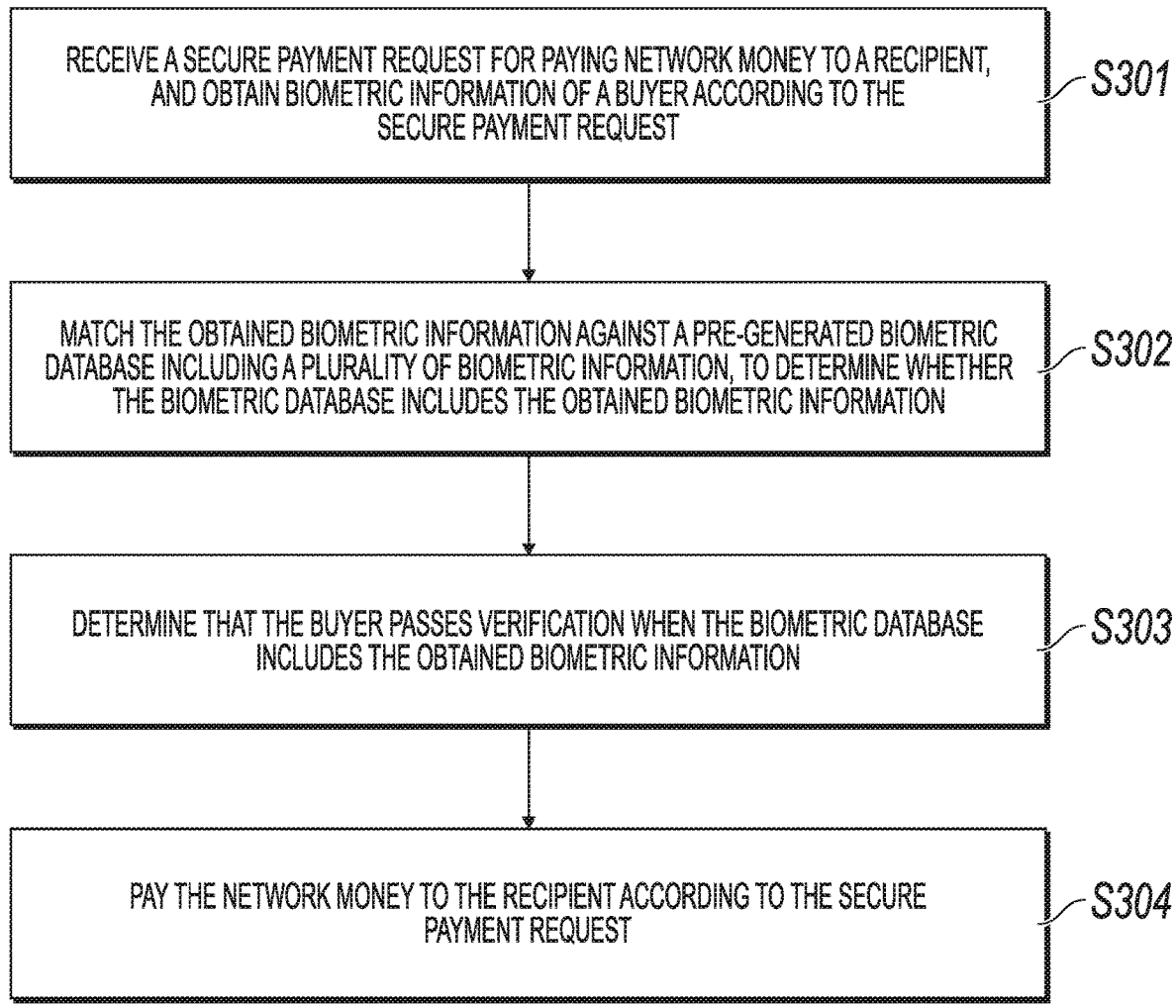
FIG. 3 is a schematic flowchart of a method for secure payment based on a biometric feature according to another embodiment of the present invention.

FIG. 3 is a schematic flowchart of a method for secure payment based on a biometric feature according to another embodiment of the present invention. As shown in FIG. 3, the method includes steps S301 to S304.

Step S301: Receive a secure payment request for paying network money to a recipient, and obtain biometric information of a buyer according to the secure payment request.

The biometric information includes at least a facial feature, iris, or fingerprint.

Step S302: Match the obtained biometric information against a pre-generated biometric database including a plurality of biometric information, to determine whether the biometric database includes the obtained biometric information.

Step S303: Determine that the buyer passes verification when the biometric database includes the obtained biometric information.

Step S304: Pay the network money to the recipient according to the secure payment request.

In this embodiment, the biometric database includes less biometric information than a global biometric database, which includes a large amount of biometric information. Therefore, the biometric information of the pending verification party is matched against the biometric database, and whether the buyer passes verification is determined according to a match result. When security verification is performed on the buyer, there is no need to make a comparison with the global biometric database, which includes a large amount of biometric information, so that verification time can be shortened, efficiency and accuracy of security verification can be significantly improved, and security can be ensured when the buyer pays the network money to the recipient.

When the biometric database is generated in the method according to steps A1 to A3, step S302 can be performed in the following method: First, a target biometric database corresponding to merchant information can be determined and obtained from a plurality of biometric databases, and then the obtained biometric information is matched against the target biometric database.

When the biometric database is generated in the method according to steps B1 to B3, step S302 can be performed in the following method: First, a target biometric database corresponding to geographical location information can be determined and obtained from a plurality of biometric databases, and then the obtained biometric information is matched against the target biometric database.

In this embodiment, the region corresponding to the geographical location information can be obtained through division according to various criteria, such as a building, a street, or a floor area. For example, according to a building, the region corresponding to the geographical location information can be a district A, a district B, a school C, a hospital D . . . . If the geographical location information carried in the secure payment request is the district A, according to a correspondence between geographical location information and a biometric database, a target biometric database corresponding to the district A can be determined. Then the obtained biometric information is matched against the target biometric database.

Figure 4:
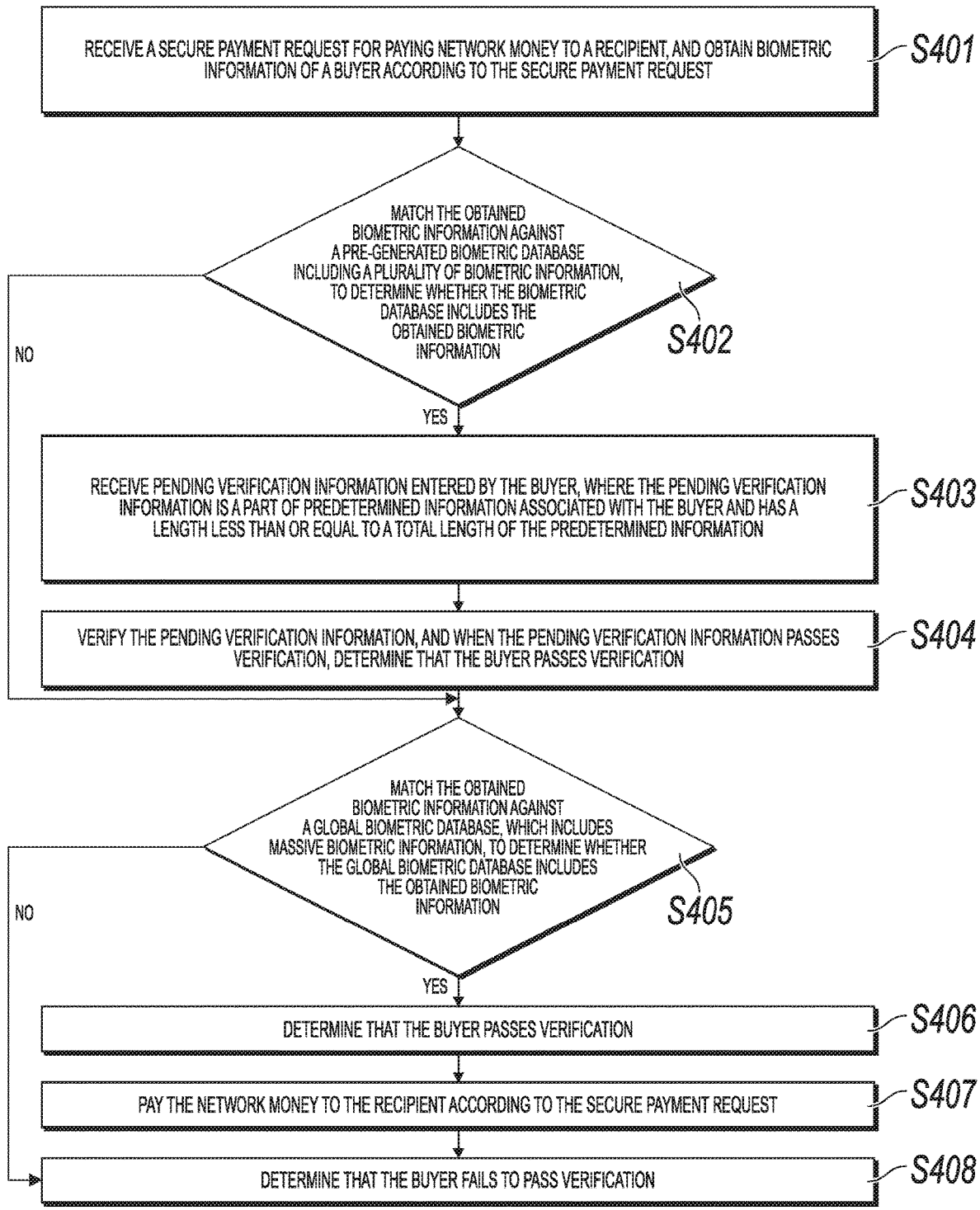
FIG. 4 is a schematic flowchart of a method for secure payment based on a biometric feature according to another embodiment of the present invention.

FIG. 4 is a schematic flowchart of a method for secure payment based on a biometric feature according to another embodiment of the present invention. As shown in FIG. 4, the method includes steps S401 to S408.

Step S401: Receive a secure payment request for paying network money to a recipient, and obtain biometric information of a buyer according to the secure payment request.

The biometric information includes at least a facial feature, iris, or fingerprint.

Step S402: Match the obtained biometric information against a pre-generated biometric database including a plurality of biometric information, to determine whether the biometric database includes the obtained biometric information. When the biometric database includes the obtained biometric information, perform step S403; when the biometric database does not include the obtained biometric information, perform step S405.

Step S403: Receive pending verification information entered by the buyer, where the pending verification information is a part of predetermined information associated with the buyer and has a length less than or equal to a total length of the predetermined information.

The predetermined information includes at least one of a communications number, an ID card number, or a name. The pending verification information includes at least one of the following in the predetermined information: information at a designated location, information with a designated length, or information with a designated length starting from a designated location.

A plurality of presentation forms of the pending verification information are described below by using an example.

(1) The pending verification information includes information at a designated location in the predetermined information. For example, the pending verification information is 8th to 11th digits of an ID card number, or 2nd to 6th digits of a communications number.

(2) The pending verification information includes information with a designated length in the predetermined information. For example, the pending verification information is an 11-digit communications number, or a 4-letter name.

(3) The pending verification information includes information with a designated length starting from a designated location in the predetermined information. For example, the pending verification information is five digits starting from a 2nd digit of an ID card number, or four digits starting from an 8th digit of a communications number (last four digits of the communication number).

In an embodiment, when the biometric database includes the obtained biometric information, an input box used to enter pending verification information can pop up in a current terminal interface. The input box can be at any location in the current terminal interface, or can be at a floating layer popping up above the current terminal interface.

In addition, when the input box pops up, prompt information used to prompt the buyer to enter the pending verification information can be output. An output method of the prompt information can include voice output, text output, etc. For example, when the prompt information is output by using the voice output method, the input box is provided and at the same time, "Please enter last four digits of your communications number" is prompted by a voice command. When the prompt information is output by using the text input method, the input box is provided and at the same time, "Last four digits of your communications number" is displayed in the current terminal interface.

Step S404: Verify the pending verification information, and when the pending verification information passes verification, determine that the buyer passes verification. Continue to perform step S407.

Step S405: Match the obtained biometric information against a global biometric database, which includes a large amount of biometric information, to determine whether the global biometric database includes the obtained biometric information. When the global biometric database includes the obtained biometric information, perform step S406; when the global biometric database does not include the obtained biometric information, perform step S408.

The biometric information in the global biometric database is more than the biometric information in the biometric database.

Step S406: Determine that the buyer passes verification.

Step S407: Pay the network money to the recipient according to the secure payment request.

Step S408: Determine that the buyer fails to pass verification. In this case, prompt information used to inform the buyer of failed verification can be output.

In addition, after step S405 is performed, if the global biometric database includes the obtained biometric information, pending verification information entered by the buyer can be further received. The pending verification information is a part of predetermined information associated with the buyer and has a length less than or equal to a total length of the predetermined information. Therefore, a purpose of improving security verification accuracy can be achieved.

Figure 5:
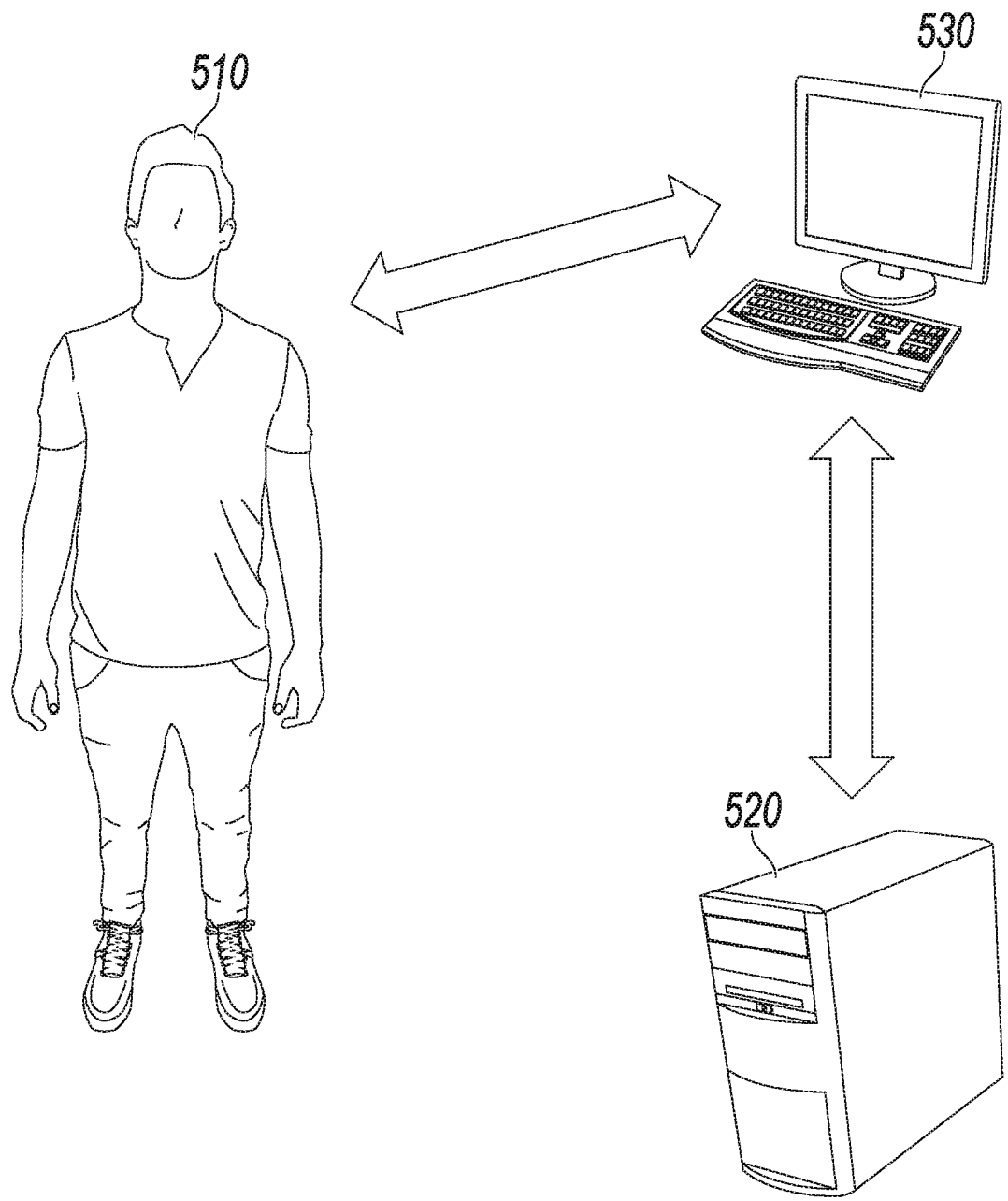
FIG. 5 is an architectural diagram of a secure payment system according to a specific embodiment of the present invention.

For example, in a secure payment system architecture shown in FIG. 5, a buyer 510, a recipient 520, and a merchant cashier device 530 are included. After the buyer 510 triggers a secure payment request, the merchant cashier device 530 begins to obtain biometric information of the buyer 510 (for example, read the face of the buyer 510 to obtain facial information of the buyer 510), and verifies the obtained biometric information. During specific verification, the obtained biometric information is matched against a pre-generated biometric database. If a match result is that the biometric database includes the obtained biometric information, prompt information "Please enter last four digits of your mobile number" and an input box 531 pop up in an interface of the merchant cashier device 530, as shown in FIG. 6.

Figure 6:
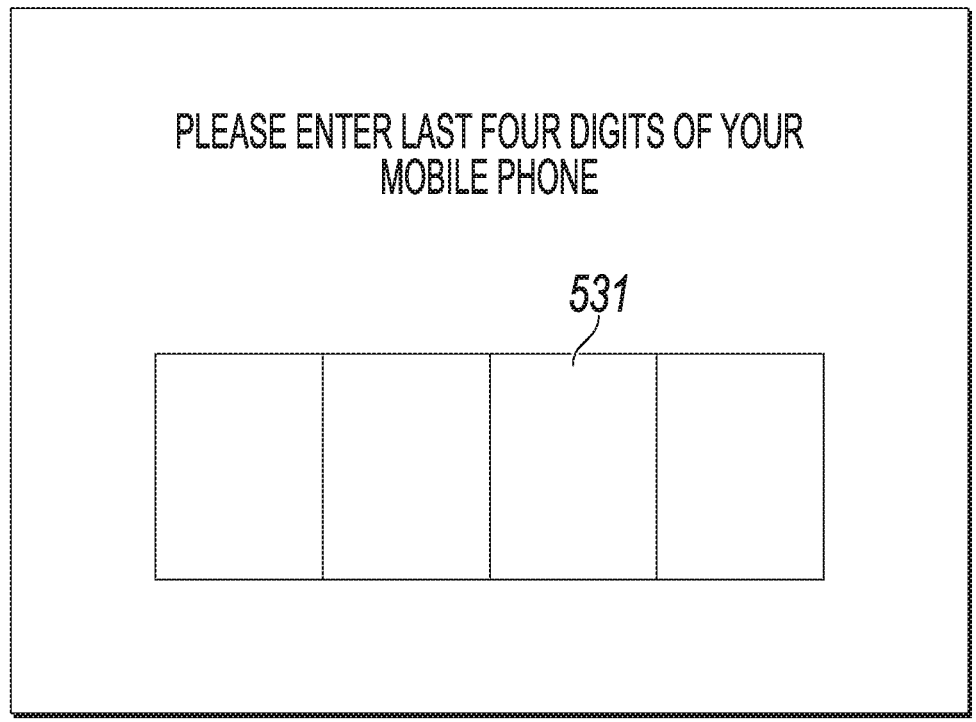
FIG. 6 is a schematic diagram of an interface of a merchant cashier device in an architectural diagram of a secure payment system according to a specific embodiment of the present invention.
Figure 7:
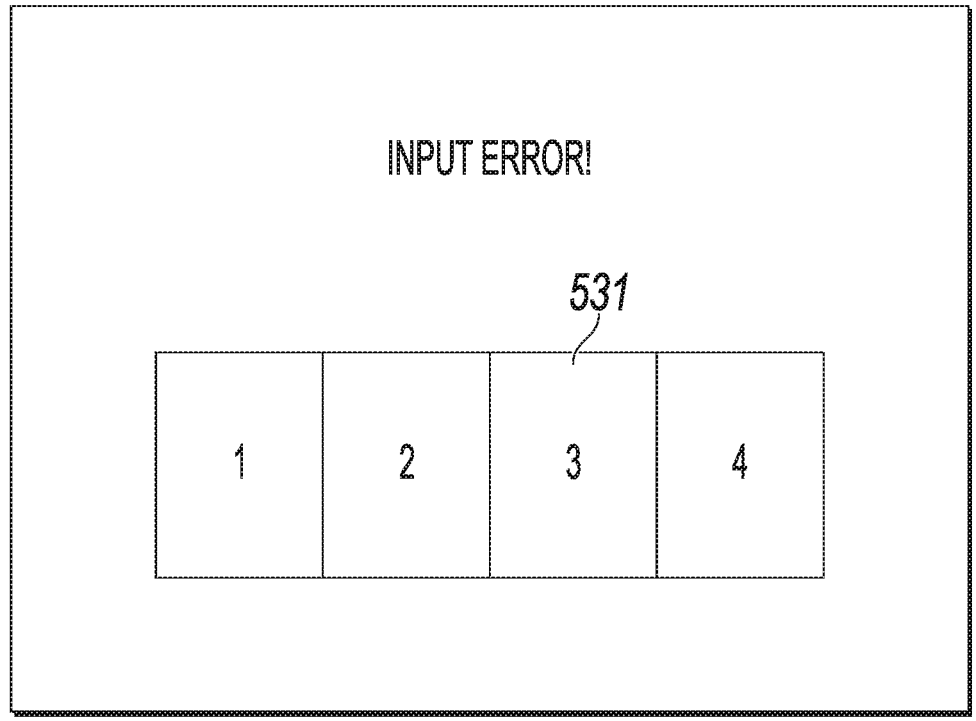
FIG. 7 is a schematic diagram of another interface of a merchant cashier device in an architectural diagram of a secure payment system according to a specific embodiment of the present invention.

In FIG. 6, the input box 531 can be divided into a plurality of input sub-boxes, and an input sub-box quantity is the same as a digit quantity of pending verification information to be entered by the buyer 510. In this embodiment, because the pending verification information is last four digits of the mobile number, that is, the pending verification information has four digits, the input box 531 is divided into four input sub-boxes and the buyer 510 can enter last four digits of the mobile phone to the input box 531. Then, the merchant cashier device 530 continues to verify the pending verification information entered by the buyer 510. Assume the last four digits of the mobile number are "1235" in this embodiment. If the buyer 510 enters pending verification information "1235", the merchant cashier device 530 compares the pending verification information "1235" entered by the buyer 510 against the correct last four digits "1235" of the mobile number, determines that the buyer 510 passes verification, and pays network money to the recipient 520. If the buyer 510 enters pending verification information "1234", the merchant cashier device 530 compares the pending verification information "1234" entered by the buyer 510 against the correct last four digits "1235" of the mobile number, and can determine that the buyer 510 makes an input error, that is, verification fails. In this case, the merchant cashier device 530 can output prompt information used to inform the buyer 510 of an input error in the interface, as shown by the text information "Input error!" in the interface in FIG. 7. In this case, the merchant cashier device 530 can directly end this payment operation or pop up a new input box 531 for the buyer 510 to reenter pending verification information.

In the technical solution in this embodiment, when the biometric database includes the obtained biometric information, the pending verification information entered by the buyer is received. The pending verification information is a part of predetermined information associated with the buyer and has a length less than or equal to a total length of the predetermined information. Then the pending verification information is verified. When the pending verification information passes verification, it is determined that the buyer passes verification, and the network money is paid to the recipient according to the secure payment request. When the length of the pending verification information is equal to the total length of the predetermined information, in the technical solution, the biometric information of the pending verification information and the entered pending verification information are verified sequentially, accuracy of the security verification greatly improves, and security can be ensured when the buyer pays network money to the recipient. When the length of the pending verification information is less than the total length of the predetermined information, in the technical solution, in addition to the greatly improved accuracy of the security verification, security can be ensured when the buyer pays network money to the recipient, and the buyer only needs to enter a small part of information to complete the security verification, so that the buyer can manually enter less content, user experience can be improved.

In conclusion, the particular embodiments of the present idea have been described. Other embodiments are within the scope of the appended claims. In some situations, actions described in the claims can be performed in different sequences, and an expected result can still be achieved. In addition, to achieve the expected result, a specific sequence or a series of sequences in the process shown in the accompanying diagrams are not necessary. In some implementations, multi-task processing and parallel processing can be beneficial.

The method for security verification based on the biometric feature according to the embodiments of the present application is described above. Based on a same idea, the embodiments of the present application further provide an apparatus for security verification based on a biometric feature and an apparatus for secure payment based on a biometric feature.

Figure 8:
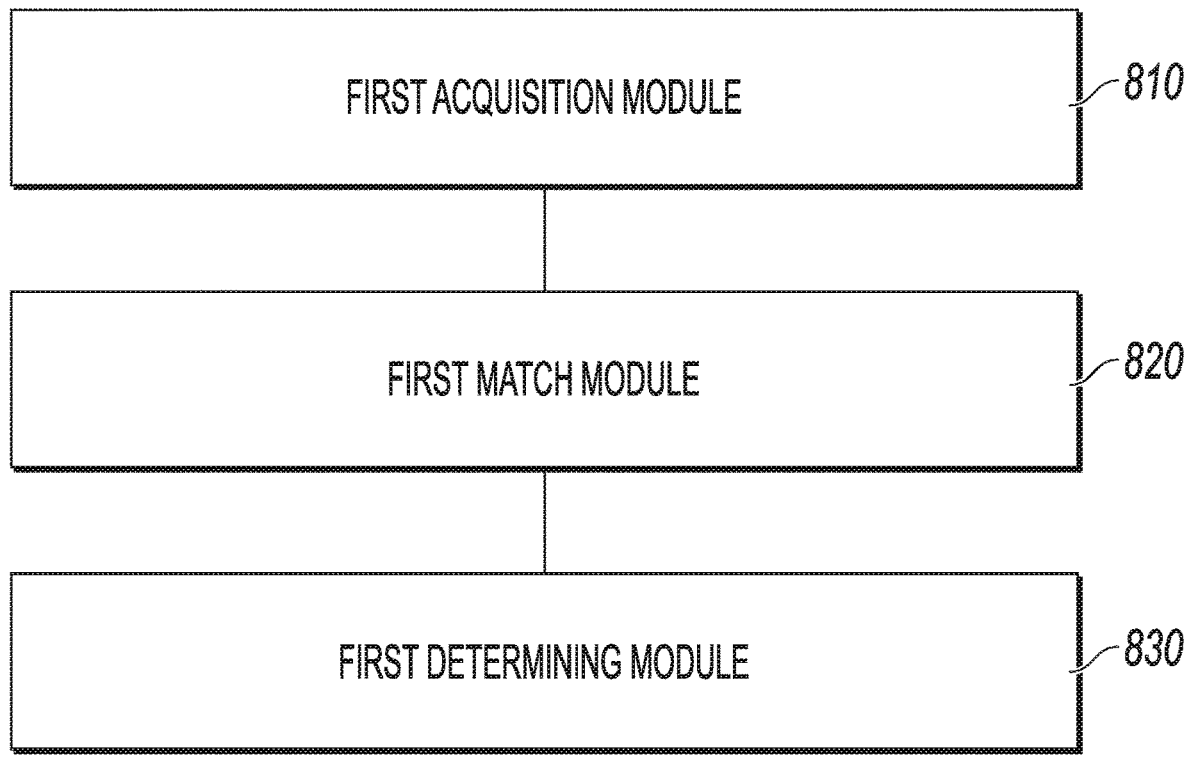
FIG. 8 is a schematic block diagram of an apparatus for security verification based on a biometric feature according to an embodiment of the present invention.

FIG. 8 is a schematic block diagram of an apparatus for security verification based on a biometric feature according to an embodiment of the present invention. As shown in FIG. 8, the apparatus includes: a first acquisition module 810, configured to receive a security verification request, and obtain biometric information of a pending verification party according to the security verification request; a first match module 820, configured to match the obtained biometric information against a pre-generated biometric database including a plurality of biometric information, to determine whether the biometric database includes the obtained biometric information; and a first determining module 830, configured to determine that the pending verification party passes verification when the biometric database includes the obtained biometric information.

Optionally, the first determining module 830 includes: a first receiving unit, configured to: when the biometric database includes the obtained biometric information, receive pending verification information entered by the pending verification party, where the pending verification information is a part of predetermined information associated with the pending verification party and has a length less than or equal to a total length of the predetermined information; and a first determining unit, configured to verify the pending verification information, and when the pending verification information passes verification, determine that the pending verification party passes verification.

Optionally, the first determining module 830 further includes: an output unit, configured to: when the biometric database includes the obtained biometric information, output prompt information used to prompt the pending verification party to enter the pending verification information.

Optionally, the biometric information includes at least a facial feature, iris, or fingerprint.

Optionally, the predetermined information includes at least one of a communications number, an ID card number, or a name; and the pending verification information includes at least one of the following in the predetermined information: information at a designated location; information with a designated length; or information with a designated length starting from a designated location.

Figure 9:
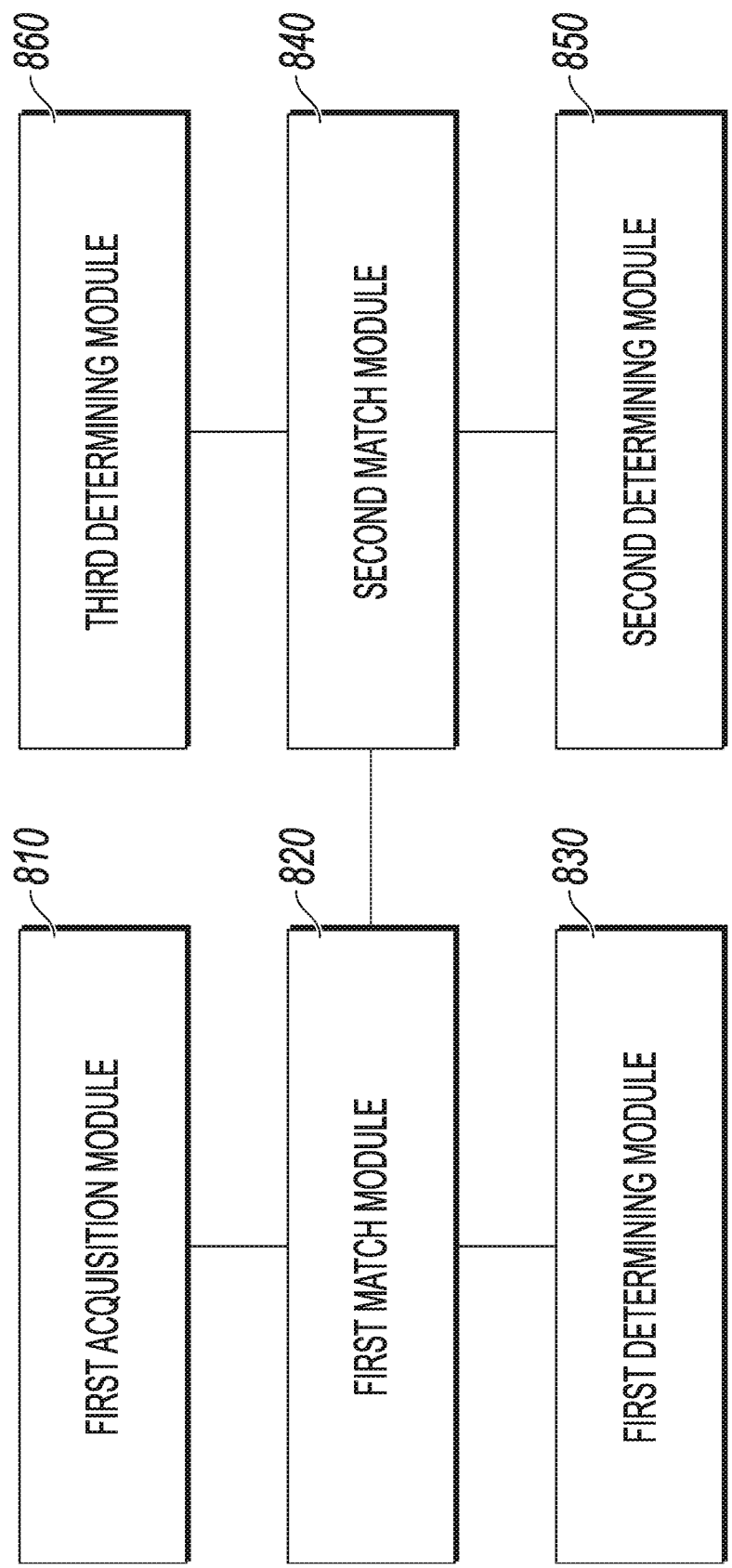
FIG. 9 is a schematic block diagram of an apparatus for security verification based on a biometric feature according to another embodiment of the present invention.

Optionally, as shown in FIG. 9, the apparatus further includes: a second match module 840, configured to: when the biometric database does not include the obtained biometric information, match the obtained biometric information against a global biometric database, which includes a large amount of biometric information, to determine whether the global biometric database includes the obtained biometric information, where the biometric information in the global biometric database is more than the biometric information in the biometric database; a second determining module 850, configured to determine that the pending verification party passes verification when the global biometric database includes the obtained biometric information; and a third determining module 860, configured to determine that the pending verification party fails to pass verification when the global biometric database does not include the obtained biometric information.

According to the apparatus in this embodiment of the present invention, when the security verification request is received, the biometric information of the pending verification party is obtained according to the security verification request. The obtained biometric information is matched against the pre-generated biometric database including a plurality of biometric information. When a match result is that the biometric database includes the obtained biometric information, it is determined that the pending verification party passes verification. In view of this, in the technical solution, the biometric information of the pending verification party is matched against the biometric database, and whether the pending verification party passes verification is determined according to the match result. When security verification is performed on the pending verification party, there is no need to make a comparison with the global biometric database, which includes a large amount of biometric information, so that verification time can be shortened, and efficiency and accuracy of security verification can be significantly improved.

Further, when the biometric database includes the obtained biometric information, the apparatus can receive the pending verification information entered by the pending verification party. The pending verification information is a part of predetermined information associated with the pending verification party and has a length less than or equal to a total length of the predetermined information. Then the pending verification information is verified. When the pending verification information passes verification, it is determined that the pending verification party passes verification. When the length of the pending verification information is equal to the total length of the predetermined information, in the technical solution, the biometric information of the pending verification information and the entered pending verification information are verified sequentially, and accuracy of the security verification greatly improves. When the length of the pending verification information is less than the total length of the predetermined information, in the technical solution, in addition to the greatly improved accuracy of the security verification, the pending verification party only needs to enter a small part of information to complete the security verification, so that the pending verification party can manually enter less content, and the user experience can be improved.

Figure 10:
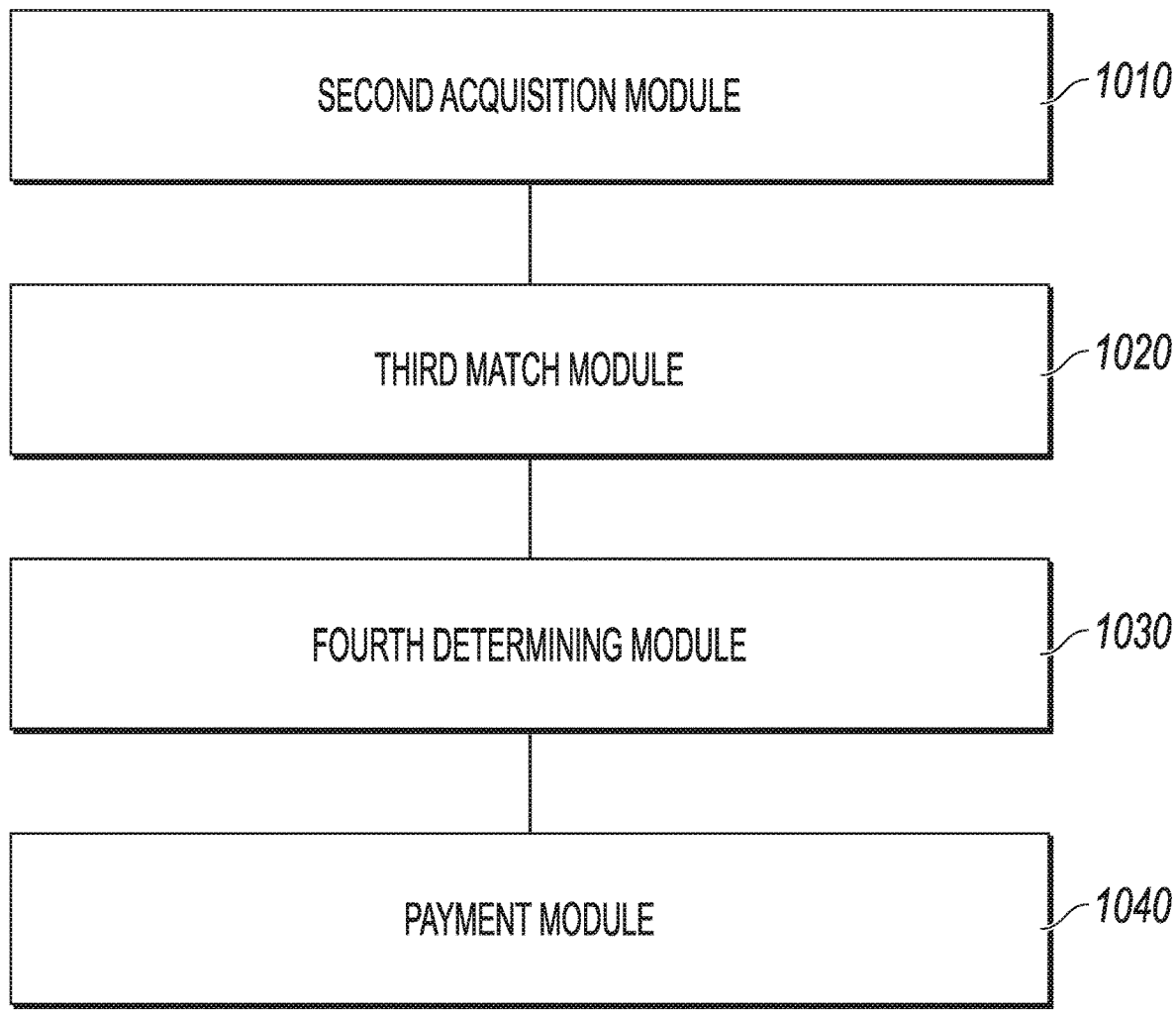
FIG. 10 is a schematic block diagram of an apparatus for secure payment based on a biometric feature according to an embodiment of the present invention.

FIG. 10 is a schematic block diagram of an apparatus for secure payment based on a biometric feature according to an embodiment of the present invention. As shown in FIG. 10, the apparatus includes: a second acquisition module 1010, configured to receive a secure payment request for paying network money to a recipient, and obtain biometric information of a buyer according to the secure payment request; a third match module 1020, configured to match the obtained biometric information against a pre-generated biometric database including a plurality of biometric information, to determine whether the biometric database includes the obtained biometric information; a fourth determining module 1030, configured to determine that the buyer passes verification when the biometric database includes the obtained biometric information; and a payment module 1040, configured to pay the network money to the recipient according to the secure payment request.

Optionally, the fourth determining module 1030 includes: a second receiving unit, configured to: when the biometric database includes the obtained biometric information, receive pending verification information entered by the buyer, where the pending verification information is a part of predetermined information associated with the buyer and has a length less than or equal to a total length of the predetermined information; and a second determining unit, configured to verify the pending verification information, and when the pending verification information passes verification, determine that the buyer passes verification.

Optionally, the biometric information includes at least a facial feature, iris, or fingerprint.

Optionally, the predetermined information includes at least one of a communications number, an ID card number, or a name; and the pending verification information includes at least one of the following in the predetermined information: information at a designated location; information with a designated length; or information with a designated length starting from a designated location.

Optionally, the apparatus further includes: a fourth match module, configured to: when the biometric database does not include the obtained biometric information, match the obtained biometric information against a global biometric database, which includes a large amount of biometric information, to determine whether the global biometric database includes the obtained biometric information, where the biometric information in the global biometric database is more than the biometric information in the biometric database; a fifth determining module, configured to determine that the buyer passes verification when the global biometric database includes the obtained biometric information; and a sixth determining module, configured to determine that the buyer fails to pass verification when the global biometric database does not include the obtained biometric information.

Optionally, the biometric database corresponds to additional information; the secure payment request includes the additional information; and the third match module 1020 includes an acquisition unit, configured to determine and obtain a target biometric database corresponding to the additional information from a plurality of biometric databases; and a match unit, configured to match the recognized biometric information against the target biometric database.

Optionally, the additional information includes at least one of the following: merchant information corresponding to the recipient; or geographical location information of the buyer.

Optionally, when the additional information includes the merchant information corresponding to the recipient, the target biometric database is a biometric database corresponding to the merchant information; and correspondingly, the apparatus further includes a first generation module, configured to: obtain a plurality of historical buyers corresponding to the merchant information when a request for generating a biometric database is received, where the generation request carries the merchant information; for the plurality of historical buyers, determine whether each historical buyer satisfies a first predetermined condition, and select a historical buyer who satisfies the first predetermined condition as a first buyer, where the first predetermined condition includes at least one of the following: a transaction quantity with the recipient reaches a first predetermined quantity; or a transaction frequency with the recipient reaches a first predetermined frequency; obtain biometric information corresponding to each first buyer; and collect the biometric information of the first buyers, and generate the biometric database corresponding to the merchant information.

Optionally, when the additional information includes the geographical location information of the buyer, the target biometric database is a biometric database corresponding to the geographical location information; and correspondingly, the apparatus further includes a second generation module, configured to: obtain a plurality of historical buyers corresponding to the geographical location information of the buyer when a request for generating a biometric database is received, where the generation request carries the geographical location information; for the plurality of historical buyers, determine whether each historical buyer satisfies a second predetermined condition, and select a historical buyer who satisfies the second predetermined condition as a second buyer, where the second predetermined condition includes at least one of the following: a transaction quantity reaches a second predetermined quantity; or a transaction frequency reaches a second predetermined frequency; obtain biometric information corresponding to each second buyer; and collect the biometric information of the second buyers, and generate the biometric database corresponding to the geographical location information.

According to the apparatus provided in this embodiment of the present invention, the biometric information of the pending verification party is matched against the biometric database, and whether the buyer passes verification is determined according to a match result. When security verification is performed on the buyer, there is no need to make a comparison with the global biometric database, which includes a large amount of biometric information, so that verification time can be shortened, efficiency and accuracy of security verification can be significantly improved, and security can be ensured when the buyer pays network money to the recipient.

Further, when the biometric database includes the obtained biometric information, the apparatus can receive the pending verification information entered by the buyer. The pending verification information is a part of predetermined information associated with the buyer and has a length less than or equal to a total length of the predetermined information. Then the pending verification information is verified. When the pending verification information passes verification, it is determined that the buyer passes verification, and the network money is paid to the recipient according to the secure payment request. When the length of the pending verification information is equal to the total length of the predetermined information, in the technical solution, the biometric information of the pending verification information and the entered pending verification information are verified sequentially, accuracy of the security verification greatly improves, and security can be ensured when the buyer pays network money to the recipient. When the length of the pending verification information is less than the total length of the predetermined information, in the technical solution, in addition to the greatly improved accuracy of the security verification, security can be ensured when the buyer pays network money to the recipient, and the buyer only needs to enter a small part of information to complete the security verification, so that the buyer can manually enter less content, user experience can be improved.

A person skilled in the art should understand that, the apparatus for security verification based on the biometric feature in FIG. 8 and FIG. 9 can be used to implement the previously described method for security verification based on the biometric feature. The apparatus for secure payment based on the biometric feature in FIG. 10 can be used to implement the previously described method for secure payment based on the biometric feature. Detailed descriptions of the apparatus embodiments are similar to the previous descriptions of the method embodiments. For brevity, details are not described here again.

Figure 11:
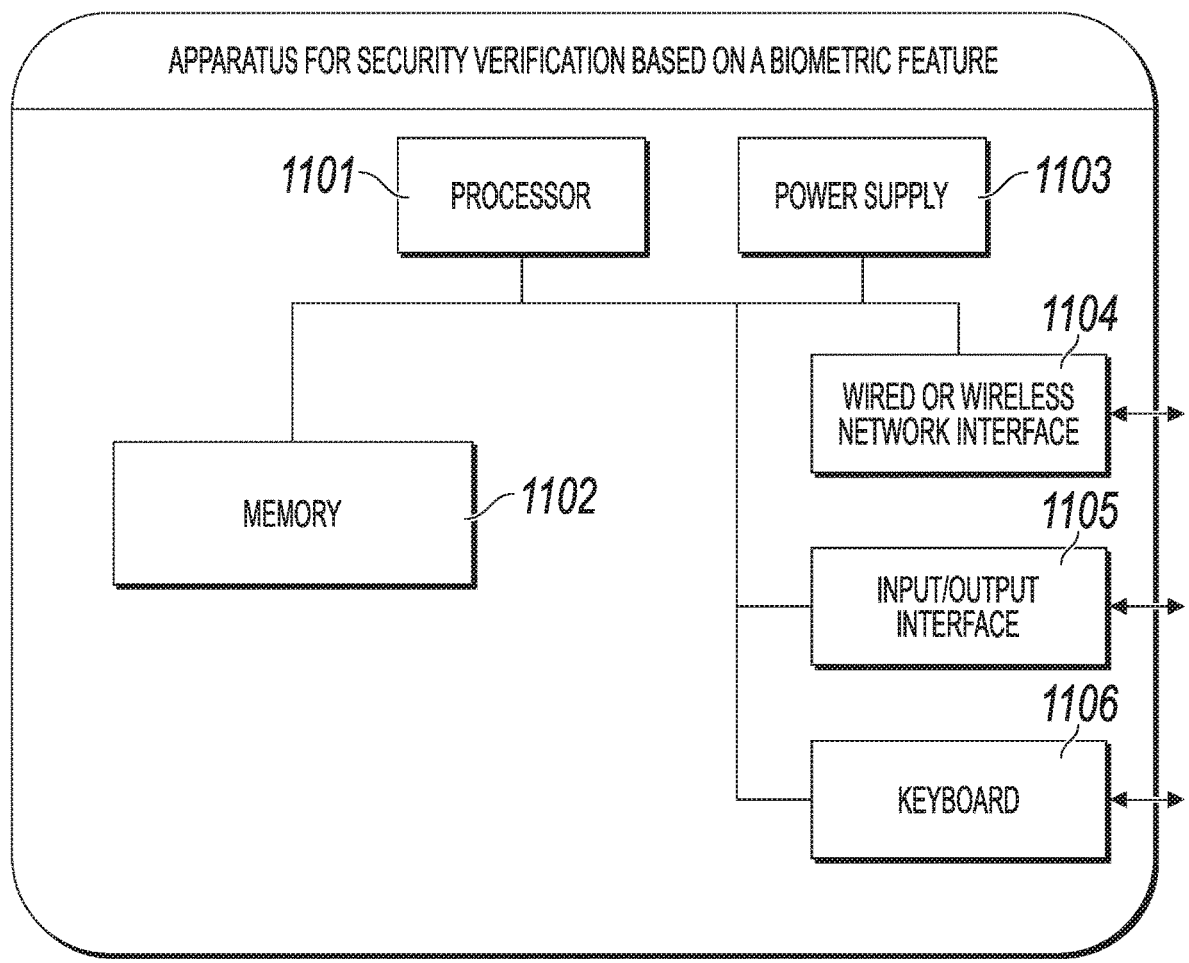
FIG. 11 is a schematic block diagram of an apparatus for security verification based on a biometric feature according to another embodiment of the present invention.

Based on a same idea, an embodiment of the present application further provides an apparatus for security verification based on a biometric feature, as shown in FIG. 11. The apparatus for security verification based on the biometric feature can vary greatly according to configuration or performance, and can include one or more processor 1101 and a memory 1102. The memory 1102 can store one or more storage application programs or data. The memory 1102 can be transient storage or permanent storage. The application program stored on the memory 1102 can include one or more modules (not shown in the figure). Each module can include a series of computer executable instructions for the apparatus for security verification based on the biometric feature. Further, the processor 1101 can be configured to communicate with the memory 1102. The processor 1101 in the apparatus for security verification based on the biometric feature can execute a series of computer executable instructions in the memory 1102. The apparatus for security verification based on the biometric feature can further include one or more power supplies 1103, one or more wired or wireless network interfaces 1104, one or more input/output interfaces 1105, and one or more keyboards 1106.

Specifically, in this embodiment, the apparatus for security verification based on the biometric feature includes a memory and one or more programs. The one or more programs can be stored in the memory. The one or more programs can include one or more modules. Each module can include a series of computer executable instructions for the apparatus for security verification based on the biometric feature. According to configuration, one or more processors can execute the following computer executable instructions included in the one or more programs: receiving a security verification request, and obtaining biometric information of a pending verification party according to the security verification request; matching the obtained biometric information against a pre-generated biometric database including a plurality of biometric information, to determine whether the biometric database includes the obtained biometric information; and determining that the pending verification party passes verification when the biometric database includes the obtained biometric information.

Figure 12:
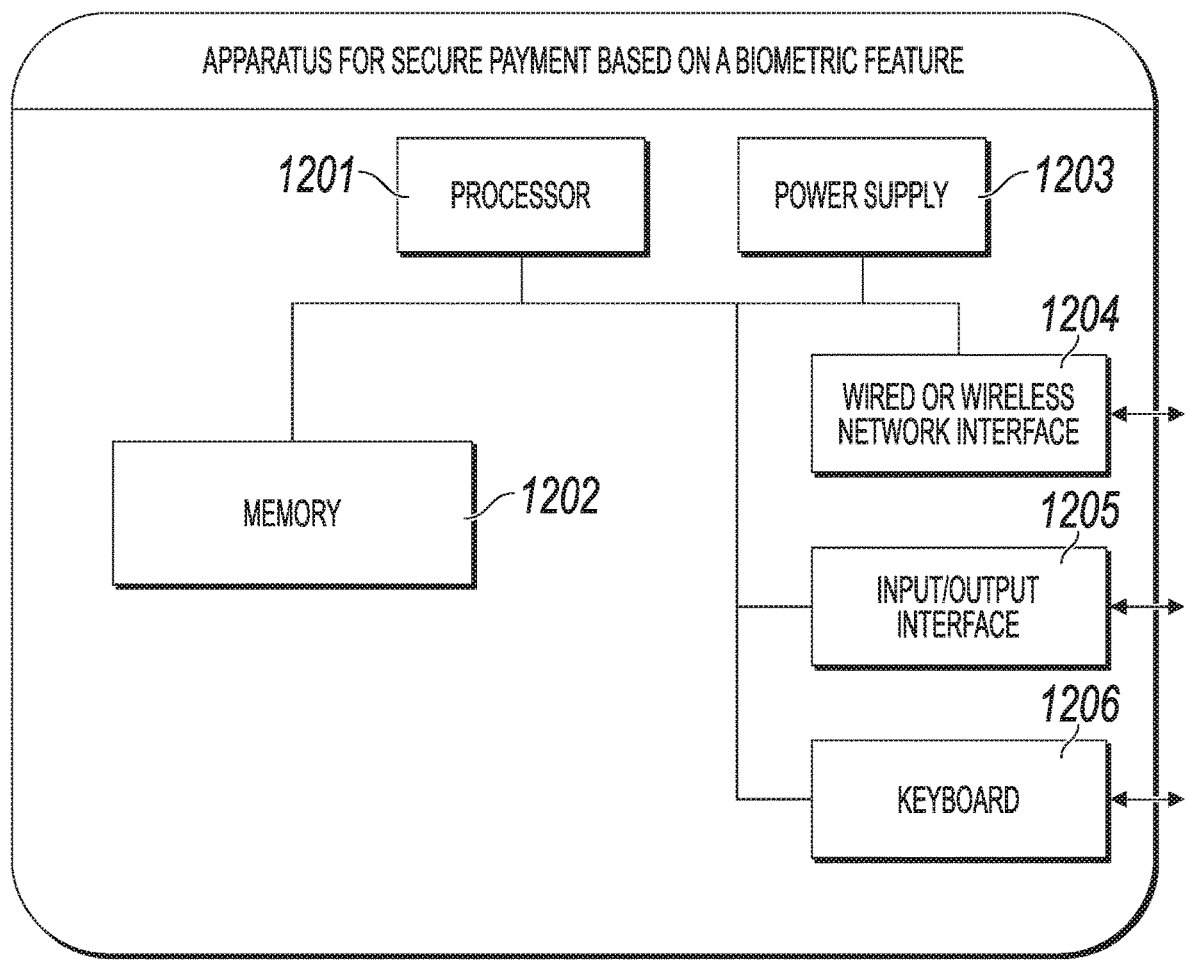
FIG. 12 is a schematic block diagram of an apparatus for secure payment based on a biometric feature according to another embodiment of the present invention.

Based on a same idea, an embodiment of the present application further provides an apparatus for secure payment based on a biometric feature, as shown in FIG. 12. The apparatus for secure payment based on the biometric feature can vary greatly according to configuration or performance, and can include one or more processor 1201 and a memory 1202. The memory 1202 can store one or more storage application programs or data. The memory 1202 can be transient storage or permanent storage. The application program stored on the memory 1202 can include one or more modules (not shown in the figure). Each module can include a series of computer executable instructions for the apparatus for secure payment based on the biometric feature. Further, the processor 1201 can be configured to communicate with the memory 1202. The processor 1201 in the apparatus for secure payment based on the biometric feature can execute a series of computer executable instructions in the memory 1202. The apparatus for secure payment based on the biometric feature can further include one or more power supplies 1203, one or more wired or wireless network interfaces 1204, one or more input/output interfaces 1205, and one or more keyboards 1206.

Specifically, in this embodiment, the apparatus for secure payment based on the biometric feature includes a memory and one or more programs. The one or more programs can be stored in the memory. The one or more programs can include one or more modules. Each module can include a series of computer executable instructions for the apparatus for secure payment based on the biometric feature. According to configuration, one or more processors can execute the following computer executable instructions included in the one or more programs: receiving a secure payment request for paying network money to a recipient, and obtaining biometric information of a buyer according to the secure payment request; matching the obtained biometric information against a pre-generated biometric database including a plurality of biometric information, to determine whether the biometric database includes the obtained biometric information; determining that the buyer passes verification when the biometric database includes the obtained biometric information; and paying the network money to the recipient according to the secure payment request.

An embodiment of the present application further proposes a computer readable storage medium. The computer readable storage medium stores one or more programs. The one or more programs can include an instruction. When the instruction is executed by an electronic device including a plurality of application programs, the electronic device can perform the method and apparatus for security verification based on the biometric feature, and is specifically configured to: receive a security verification request, and obtain biometric information of a pending verification party according to the security verification request; match the obtained biometric information against a pre-generated biometric database including a plurality of biometric information, to determine whether the biometric database includes the obtained biometric information; and determine that the pending verification party passes verification when the biometric database includes the obtained biometric information.

An embodiment of the present application further proposes a computer readable storage medium. The computer readable storage medium stores one or more programs. The one or more programs can include an instruction. When the instruction is executed by an electronic device including a plurality of application programs, the electronic device can perform the method and apparatus for secure payment based on the biometric feature, and is specifically configured to: receive a secure payment request for paying network money to a recipient, and obtain biometric information of a buyer according to the secure payment request; match the obtained biometric information against a pre-generated biometric database including a plurality of biometric information, to determine whether the biometric database includes the obtained biometric information; determine that the buyer passes verification when the biometric database includes the obtained biometric information; and pay the network money to the recipient according to the secure payment request.

The previous embodiments describe systems, apparatuses, modules or units that can be specifically implemented by a computer chip or an entity or a product having a specific function. A typical implementation device is a computer. Specifically, the computer can be, for example, one or a combination of a personal computer, a laptop computer, a cellular phone, a camera phone, a smartphone, a personal digital assistant, a media player, a navigation device, an email device, a game console, a tablet computer, or a wearable device.

For ease of description, the apparatus is described by dividing the functions into various units. Certainly, when the present application is implemented, the functions of each unit can be implemented in one or more pieces of software and/or hardware.

A person skilled in the art should understand that the embodiments of the present application can be provided as a method, a system, or a computer program product. Therefore, the present application can use a form of hardware only embodiments, software only embodiments, or embodiments with a combination of software and hardware. Moreover, the present application can use a form of a computer program product that is implemented on one or more computer-usable storage media (including but not limited to a disk memory, a CD-ROM, an optical memory, etc.) that include computer usable program code.

The present application is described with reference to the flowcharts and/or block diagrams of the method, the device (system), and the computer program product according to the embodiments of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions can be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computer device includes one or more processors (CPU), an input/output interface, a network interface, and a memory.

The memory can include forms of a volatile memory, a random access memory (RAM), and/or a non-volatile memory in computer readable media, such as a read-only memory (ROM) or a flash memory (flash RAM). The memory is an example of the computer readable media.

The computer readable media include permanent and temporary, and removable and irremovable media, and information can be stored by using any method or technology. The information can be a computer readable instruction, a data structure, a program module, or other data. For example, computer storage media include, but are not limited to, a parameter random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a cassette-type tape, a magnetic tape, a disk storage or other magnetic storage devices or any other non-transmission media, and can be used to store information that can be accessed by a calculation device. According to the definitions in this specification, the computer readable media do not include transitory media, such as a modulated data signal and carrier.

It should be noted that, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, article, or device that includes the element.

A person skilled in the art should understand that the embodiments of the present application can be provided as a method, a system, or a computer program product. Therefore, the present application can use a form of hardware only embodiments, software only embodiments, or embodiments with a combination of software and hardware. Moreover, the present application can use a form of a computer program product that is implemented on one or more computer-usable storage media (including but not limited to a disk memory, a CD-ROM, an optical memory, etc.) that include computer usable program code.

The present application can be described in the general context of executable computer instructions executed by a computer, for example, a program module. Generally, the program unit includes a routine, program, object, component, data structure, etc. for executing a particular task or implementing a particular abstract data type. The present application can be practiced in distributed computing environments that tasks are performed by remote processing devices that are connected through a communications network. In a distributed computing environment, program modules can be located in both local and remote computer storage media including storage devices.

The embodiments in this specification are all described in a progressive manner, for same or similar parts in the embodiments, reference can be made to these embodiments, and each embodiment focuses on a difference from other embodiments. Especially, a system embodiment is basically similar to a method embodiment, and therefore is described briefly; for related parts, reference can be made to partial descriptions in the method embodiment.

The previous descriptions are merely embodiments of the present application, but are not intended to limit the present application. A person skilled in the art can make various modifications and variations to the present application. Any modification, equivalent replacement, or improvement made without departing from the spirit and principle of the present application shall fall within the scope of the claims of the present application.

Figure 13:
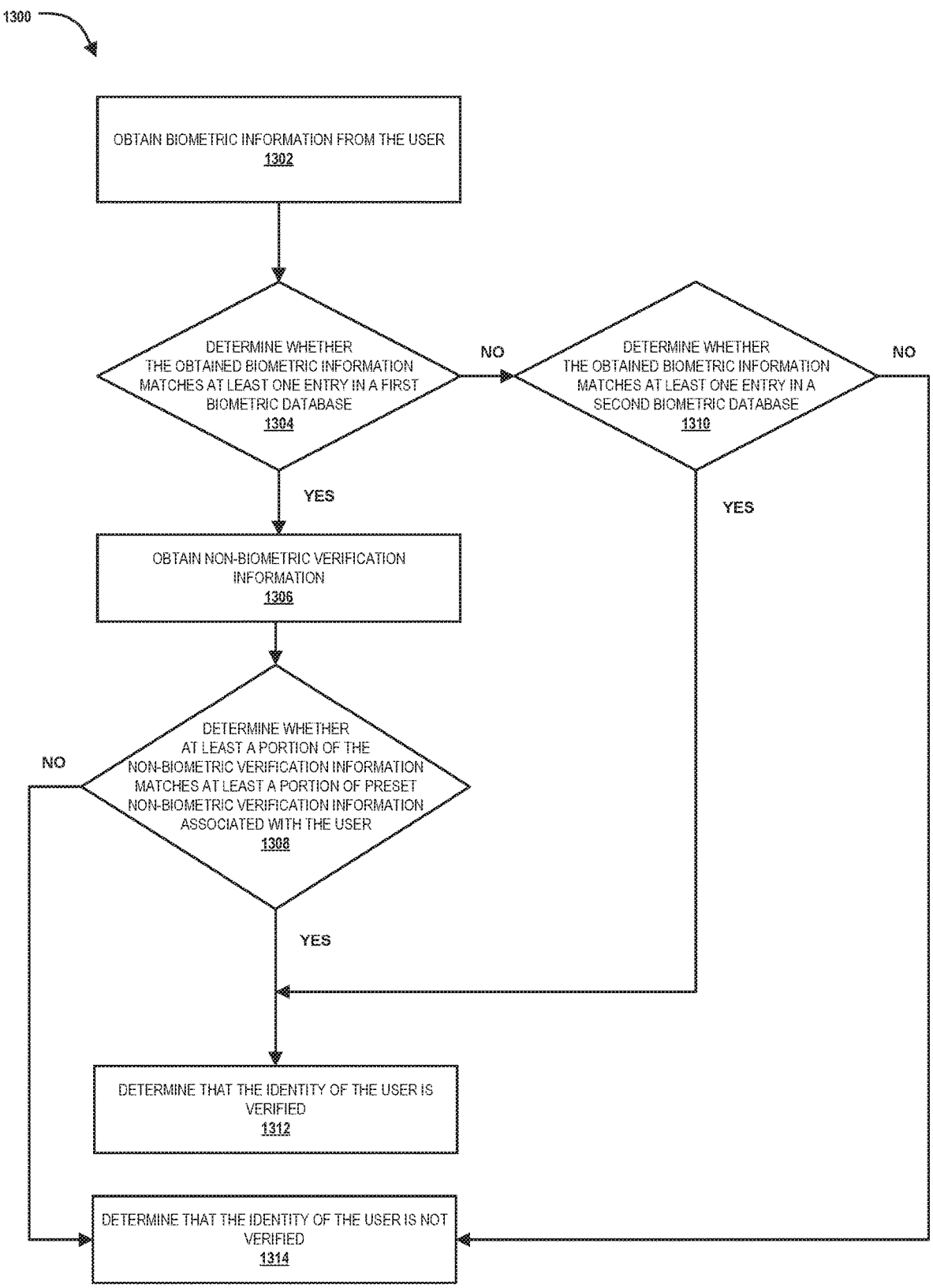
FIG. 13 is a flowchart illustrating an example of a computer-implemented method for multi-factor biometric-based verification of an identity of a user, according to an implementation of the present disclosure.

FIG. 13 is a flowchart illustrating an example of a computer-implemented method 1300 for multi-factor biometric-based verification of an identity of a user, according to an implementation of the present disclosure. For clarity of presentation, the description that follows generally describes method 1300 in the context of the other figures in this description. However, it will be understood that method 1300 can be performed, for example, by any system, environment, software, and hardware, or a combination of systems, environments, software, and hardware, as appropriate. In some implementations, various steps of method 1300 can be run in parallel, in combination, in loops, or in any order.

Biometric-based user identity verification may be performed in various contexts in both the physical domain and the digital domain. In the physical domain, user identity verification may be performed for controlling access to a restricted area. For example, access to a work building or a server room may be controlled through biometric-based user identity verification. In the digital domain, user identity verification may be performed to improve security for financial transactions, online payments, or in-store digital payments.

Various types of biometric information of varying degree of complexity may be chosen for implementing a biometric-based user identity verification process. Examples of biometric information include facial features, iris features, and fingerprints. Different types of biometric information may have a varying degree of verification accuracy, and a biometric-based identity verification may return more than one potential identity match due to a statistical nature of biometric-based identity verification schemes. Improving the verification accuracy of a biometrics-only identity verification approach may involve tradeoffs, for example, in increased complexities of biometric information capturing systems, increased biometric information data size, or increased computational complexity of the biometric verification process. As such, one way of improving the verification accuracy of a biometric-based identity verification process is to implement a second, non-biometric factor as part of the identity verification process.

At 1302, biometric information is obtained from the user. For example, the biometric information may be obtained through a fingerprint sensor of a smartphone, a front-facing camera of a smartphone, or a camera associated with a point-of-sale machine. The biometric information may be obtained in various contexts. For example, the biometric information may be obtained from the user as a part of a user identity verification process. As such, in some implementations, the method 1300 may include the steps of: before obtaining the biometric information from the user, receiving an identity verification request for verifying the identity of the user. From 1302, method 1300 proceeds to 1304.

At 1304, a determination is made as to whether the obtained biometric information matches at least one entry in a first biometric database. The first biometric database contains multiple entries of biometric information that correspond to different users of the identity verification process. By matching the obtained biometric information with an entry of the first biometric database, the identity of the user may be determined.

In general, matching of biometric information is statistical in nature, as biometric information is a digital representation of physical biometric features of a person, such as a face, an iris, or a fingerprint. Physical features are analog in nature, and as such, digital representations of the physical features are typically approximations of the underlying biometric features. Additionally, measurements of the biometric features are susceptible to various sources of inaccuracies, such as measurement noises, measurement variations, and digitization noises. As such, a first biometric information is said to match a second biometric information when the probability of the first and second biometric information being obtained from the same person is greater than a preset threshold (e.g., 90%, 95%, 99%, or 99.9%).

The matching of biometric information may be performed in various ways. For example, techniques such as Hamming distance-based comparison, Adaboost method, and artificial neural network may be used to determine the likelihood of the first and second biometric information being obtained from the same person.

If it is determined that the obtained biometric information matches the at least one entry in the first biometric database, method 1300 proceeds to 1306. Otherwise, if it is determined that the obtained biometric information does not match the at least one entry in the first biometric database, method 1300 proceeds to 1310.

At 1306, at least a portion of non-biometric verification information is obtained based on a determination that the obtained biometric information matches the at least one entry in the first biometric database. As the biometric information matching is statistical in nature, in some cases, the obtained biometric information may match with two or more entries of the first biometric database. Furthermore, in some cases, a false match may occur where the obtained biometric information is determined to match an entry of the first biometric database that in fact belongs to a different user. As such, the non-biometric information may be used as a second factor to improve the accuracy of the identity verification process.

In various user identity verification scenarios, the speed of the verification process, in addition to the accuracy of the verification process, is an important factor in the quality of service experienced by the user. As the addition of the second, non-biometric factor to the identity verification process typically adds to the time needed in completing the verification process, reducing the amount of additional time spent by the user in providing the non-biometric information may improve the experience of the user.

The non-biometric verification factor in general may be any information that is not related to the human body. Examples of the non-biometric verification factor include a mobile phone number of a user, an identification card information of a user, and a name of the user. Examples of the identification card information include an employee ID number of an employee identification card, a driver license number, or a passport number. Other examples of the non-biometric verification factor include arbitrary string of characters similar to a password.

The time and effort spent by the user in providing the non-biometric information may be reduced by obtaining a subset, or a portion, of the non-biometric information. The non-biometric information is typically provided by the user through, for example, a communication terminal, such as a smartphone or a computer, or a point-of-sale machine. For example, the user may input the non-biometric information through a touchscreen interface such as an on-screen keyboard, which may be slow or prone to error. By requesting the user to provide only a portion of the non-biometric information, the time and effort spent in entry of the non-biometric information may be reduced, and the user experience may be improved. As such, in some implementations, the step 1306 may further include the steps of: outputting, through a terminal associated with the user, an instruction configured to prompt the user to provide the at least a portion of the non-biometric verification information.

The instruction provided to the user may include at least one of: a starting location of the at least a portion of the preset non-biometric verification information to be provided by the user, the starting location being a location within the preset non-biometric verification information; a length of the at least a portion of the preset non-biometric verification information to be provided by the user; or the starting location and the length of the at least a portion of the preset non-biometric verification information to be provided by the user. For example, referring to FIG. 6, the non-biometric information may be a mobile phone number. In this example, the instruction provides both the starting location ($4^{th}$ digit from the end of the mobile phone number) and the length (4 digits) of the portion of the non-biometric verification information to be provided by the user. As another example, in case where the non-biometric information is the name of the user, the instruction may request the middle name to be provided (i.e., the starting location), or request the first 4 letters of the last name (i.e., the starting location and the length). From 1306, method 1300 proceeds to 1308.

At 1308, a determination is made as to whether the at least a portion of the non-biometric verification information matches at least a portion of preset non-biometric verification information associated with the user. The preset non-biometric verification information associated with the user may be any non-biometric verification information selected by the user to be used for the identity verification process. As the non-biometric verification information is digital in nature, the at least a portion of the non-biometric verification information obtained from the user may be compared against a corresponding portion of the preset non-biometric verification information to determine whether the two are equal to determine the match.

If it is determined that the at least a portion of the non-biometric verification information matches at least a portion of preset non-biometric verification information associated with the user, method 1300 proceeds to 1312. Otherwise, if it is determined that the at least a portion of the non-biometric verification information does not match at least a portion of preset non-biometric verification information associated with the user, method 1300 proceeds to 1314.

Now, at 1310, a determination is made as to whether the obtained biometric information matches at least one entry in a second biometric database, based on a determination that the obtained biometric information does not match the at least one entry in the first biometric database. The second biometric database comprises a second number of entries greater than a first number of entries of the first biometric database. For example, the second biometric database may be a global biometric database that contains entries of biometric information corresponding to all users of the identity verification process, and the first biometric database may be a subset of the global biometric database. The computation time needed in determining whether the obtained biometric information matches an entry in a biometric database may be proportional to the number of entries contained in the biometric database. As such, by performing the matching of the obtained biometric information on the first, smaller, biometric database and only performing the matching on the second, larger, biometric database when the initial matching is unsuccessful, computation time and computational resource requirement may be reduced, and user experience may be improved as a result.

The entries of the first biometric database may be selected from the second biometric database based on various criteria. For example, frequent users of the identity verification process with an identity verification request frequency greater than a first preset frequency may be selected to be included in the first biometric database. As another example, users of the identity verification process with a total count of identity verification requests greater than a first preset count may be selected to be included in the first biometric database. As yet another example, users associated with a specific geographic region may be selected to be included in the first biometric database. In this example, multiple first biometric databases corresponding to different geographic regions may be pre-populated in the identity verification computer system implementing the method 1300. When an identity verification request is received from a particular geographic region, a biometric database corresponding to the particular geographic region may be selected as the first biometric database to be used in the identity verification process.

If it is determined that the obtained biometric information matches at least one entry in the second biometric database, the method 1300 proceeds to 1312. Otherwise, if it is determined that the obtained biometric information does not match at least one entry in the second biometric database, the method 1300 proceeds to 1314.

At 1312, a determination is made that the identity of the user is verified.

At 1314, a determination is made that the identity of the user is not verified. After 1314, method 1300 stops.

In some implementations of the method 1300, the user identity verification may be performed as a part of a digital payment transaction. By verifying the identity of the user using biometric information, the security of the digital payment transaction may be improved. As such, in some implementations, the method 1300 may further include the steps of: before obtaining the biometric information from the user, receiving, from the user, a secure payment request for making a payment to a recipient by the user. Details associated with the secure payment transaction have been described in relation to FIGS. 3 and 4. In addition, when the method 1300 is used for secure payment transactions, the method 1300 may further include the steps of: based on the determination that the identity of the user is verified, making the payment to the recipient.

In context of secure payment transactions, the secure payment request may include first information associated with the secure payment request, and the method 1300 may further include the step of: determining, from a plurality of biometric databases, a biometric database corresponding to the first information to be the first biometric database. In general, there may be a global biometric database that contains entries of biometric information corresponding to all users of the secure payment process, and the first biometric database may be a subset of the global biometric database. The computation time needed in determining whether the obtained biometric information matches an entry in a biometric database may be proportional to the number of entries contained in the biometric database. As such, by performing the matching of the obtained biometric information on the first, smaller, biometric database and only performing the matching on the second, larger, biometric database when the initial matching is unsuccessful, computation time and resource may be saved, and user experience may be improved as a result.

A plurality of biometric databases may each be populated with entries from the global biometric database that corresponds to at least a portion of the first information. For example, entries of the global biometric database that satisfy a selection criterion based on the first information may be said to correspond to the at least a portion of the first information. In some implementations, the first information associated with the secure payment request may include at least one of: recipient information associated with the recipient; or geographical region information associated with a geographical region of the user.

In the case where the first information includes the recipient information associated with the recipient, each of the plurality of biometric databases may be organized on the basis of users that have completed at least one payment transaction with a particular recipient. Typically, users have a tendency of conducting additional secure payment transactions with recipients, or merchants, that they have previously transacted with. As such, after the first secure payment transaction between the user and the recipient, the user's biometric information can be added to the biometric database that corresponds to the recipient. When the same user requests another secure payment transaction to the same recipient, the user's biometric information is now included in the biometric database corresponding to the recipient. As such, by selecting, from the plurality of biometric databases, the biometric database corresponding to the recipient to be the first biometric database, searching of the second, larger, biometric database may be avoided, improving the speed of the secure payment transaction and the user experience.

In some implementations, a first predetermined condition may be further used to determine the users to be added to the biometric database corresponding to the recipient. Some recipients, for example, may be a popular recipient (e.g., Walmart, Amazon) with which a large portion (e.g., 50%) of the total user base of the secure payment process has completed at least one transaction with. For such recipients, the recipient-specific biometric database may approach the size of the global biometric database, and the performance advantage of having a smaller first biometric database may be diminished. As such, in some implementations, the first biometric database consists of a plurality of biometric information corresponding to a plurality of first users, each of the plurality of first users having completed a payment transaction with the recipient and satisfying a first predetermined condition. The first predetermined condition comprises at least one of: whether a payment transaction quantity of a first user is greater than or equal to a first preset quantity; or whether a payment transaction frequency of the first user is greater than or equal to a first preset frequency. By using the first predetermined condition for adding biometric information of a user to the first biometric database, the size of the first biometric database may be reduced relative to the size of the global biometric database while improving the user experience of users who frequently transact with the recipient.

In the case where the first information includes the geographical region information associated with a geographical region of the user, each of the plurality of biometric databases may be organized based on the geographical regions of the users. Typically, users have a range of locations from which they typically initiate secure payment transactions. For example, range of locations may be categorized into a city, a county, a state, a country, or any arbitrary geographical region. As a result, when a payment transaction request originates from a particular geographical location, there is an increased likelihood that the biometric information of the user making the request is included in a biometric database that corresponds to a geographic region that covers the request originating location. As such, by selecting, from the plurality of biometric databases, the biometric database corresponding to the geographical region of the user to be the first biometric database, searching of the second, larger, biometric database may be avoided, improving the speed of the secure payment transaction and the user experience.

In some implementations, a second predetermined condition may be further used to determine the users to be added to a biometric database corresponding to a geographical region. Some geographical regions, for example, may have a large number of users of the secure payment service (e.g., hundreds of thousands of users, millions of users). For such geographical regions, the region-specific biometric database may reach a size at which the performance advantage of having a smaller first biometric database may be diminished. As such, in some implementations, the first biometric database consists of a plurality of biometric information corresponding to a plurality of second users, each of the plurality of second users being associated with the geographical region and satisfying a second predetermined condition. The second predetermined condition comprises at least one of: whether a payment transaction quantity of a second user is greater than or equal to a second preset quantity; or whether a payment transaction frequency of the second user is greater than or equal to a second preset frequency. By using the second predetermined condition for adding biometric information of a user to the first biometric database, the size of the first biometric database may be reduced relative to the size of the global biometric database while improving the user experience of users who frequently use the secure payment service.

Various implementations of the methods described herein may have one or more of the following technical effects. By implementing a second, non-biometric factor as part of the biometric-based identity verification process, identity verification accuracy may be improved. User experience may be improved by requesting the user to provide only a portion of the non-biometric information, as the time and effort spent in entry of the non-biometric information may be reduced. The speed of the identity verification process may be improved by performing the matching of the obtained biometric information on the first, smaller, biometric database and only performing the matching on the second, larger, biometric database when the initial matching is unsuccessful.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for multi-factor biometric-based verification of an identity of a user, the method comprising:
   obtaining biometric information from the user, wherein the biometric information comprises at least one of a facial feature, an iris feature, or a fingerprint;
   obtaining, from the user, a geographical region associated with the user;
   determining, from a plurality of biometric databases, one biometric database corresponding to the geographical region to be a first biometric database, wherein the first biometric database comprises a plurality of biometric information corresponding to a plurality of users associated with the geographical region;
   determining that the obtained biometric information does not match any entry in the first biometric database;
   in response to determining that the obtained biometric information does not match any entry in the first biometric database, determining that the obtained biometric information matches at least one entry in a second biometric database, wherein the second biometric database comprises a second number of entries greater than a first number of entries of the first biometric database;

in response to determining that the obtained biometric information matches at least one entry in the second biometric database, obtaining non-biometric verification information from the user;

determining that the non-biometric verification information matches at least a portion of preset non-biometric verification information associated with the user, wherein a length of the non-biometric verification information is less than a length of the preset non-biometric verification information; and in response to determining that the non-biometric verification information matches at least a portion of the preset non-biometric verification information associated with the user, determining that the identity of the user is verified.

2. The computer-implemented method of claim 1, wherein the preset non-biometric verification information comprises at least one of a phone number of the user, an identification (ID) card information associated with the user, or a name of the user.

3. The computer-implemented method of claim 2, wherein obtaining the non-biometric verification information comprises:

outputting, through a terminal associated with the user, an instruction configured to prompt the user to provide the non-biometric verification information, wherein the instruction comprises at least one of:
  a starting location of the at least a portion of the preset non-biometric verification information to be provided by the user, the starting location being a location within the preset non-biometric verification information;
  a length of the at least a portion of the preset non-biometric verification information to be provided by the user; or
  the starting location and the length of the at least a portion of the preset non-biometric verification information to be provided by the user.

4. The computer-implemented method of claim 1, further comprising:

before obtaining the biometric information from the user, receiving, from the user, a secure payment request for making a payment to a recipient by the user; and in response to determining that the identity of the user is verified, making the payment to the recipient.

5. The computer-implemented method of claim 4, wherein the secure payment request further comprises first information associated with the secure payment request.

6. The computer-implemented method of claim 5, wherein the first information associated with the secure payment request comprises at least one of:

recipient information associated with the recipient; or
geographical region information associated with the geographical region of the user.

7. The computer-implemented method of claim 6, wherein the first information comprises the recipient information, wherein the first biometric database comprises a plurality of biometric information corresponding to a plurality of first users, each of the plurality of first users having completed a payment transaction with the recipient and satisfying a first predetermined condition, and wherein the first predetermined condition comprises at least one of:

whether a payment transaction quantity of a first user is greater than or equal to a first preset quantity; or
whether a payment transaction frequency of the first user is greater than or equal to a first preset frequency.

8. The computer-implemented method of claim 6, wherein the first information comprises the geographical region information, wherein the first biometric database comprises a plurality of biometric information corresponding to a plurality of second users, each of the plurality of second users being associated with the geographical region and satisfying a second predetermined condition, and wherein the second predetermined condition comprises at least one of:

whether a payment transaction quantity of a second user is greater than or equal to a second preset quantity; or
whether a payment transaction frequency of the second user is greater than or equal to a second preset frequency.

9. A non-transitory, computer-readable medium storing one or more instructions executable by a computer system to perform operations comprising:

obtaining biometric information from a user, wherein the biometric information comprises at least one of a facial feature, an iris feature, or a fingerprint;

obtaining, from the user, a geographical region associated with the user;

determining, from a plurality of biometric databases, one biometric database corresponding to the geographical region to be a first biometric database, wherein the first biometric database comprises a plurality of biometric information corresponding to a plurality of users associated with the geographical region;

determining that the obtained biometric information does not match any entry in the first biometric database;

in response to determining that the obtained biometric information does not match any entry in the first biometric database, determining that the obtained biometric information matches at least one entry in a second biometric database, wherein the second biometric database comprises a second number of entries greater than a first number of entries of the first biometric database;

in response to determining that the obtained biometric information matches at least one entry in the second biometric database, obtaining non-biometric verification information from the user;

determining that the non-biometric verification information matches at least a portion of preset non-biometric verification information associated with the user, wherein a length of the non-biometric verification information is less than a length of the preset non-biometric verification information; and in response to determining that the non-biometric verification information matches at least a portion of the preset non-biometric verification information associated with the user, determining that an identity of the user is verified.

10. The computer-readable medium of claim 9, wherein the preset non-biometric verification information comprises at least one of a phone number of the user, an identification (ID) card information associated with the user, or a name of the user.

11. The computer-readable medium of claim 10, wherein obtaining the non-biometric verification information comprises:
outputting, through a terminal associated with the user, an instruction configured to prompt the user to provide the non-biometric verification information,
wherein the instruction comprises at least one of:
a starting location of the at least a portion of the preset non-biometric verification information to be provided by the user, the starting location being a location within the preset non-biometric verification information;
a length of the at least a portion of the preset non-biometric verification information to be provided by the user; or
the starting location and the length of the at least a portion of the preset non-biometric verification information to be provided by the user.

12. The computer-readable medium of claim 9, wherein the operations further comprise:
before obtaining the biometric information from the user, receiving, from the user, a secure payment request for making a payment to a recipient by the user; and
in response to determining that the identity of the user is verified, making the payment to the recipient.

13. The computer-readable medium of claim 12, wherein the secure payment request further comprises first information associated with the secure payment request.

14. The computer-readable medium of claim 13, wherein the first information associated with the secure payment request comprises at least one of:
recipient information associated with the recipient; or
geographical region information associated with the geographical region of the user.

15. The computer-readable medium of claim 14, wherein the first information comprises the recipient information,
wherein the first biometric database comprises a plurality of biometric information corresponding to a plurality of first users, each of the plurality of first users having completed a payment transaction with the recipient and satisfying a first predetermined condition, and
wherein the first predetermined condition comprises at least one of:
whether a payment transaction quantity of a first user is greater than or equal to a first preset quantity; or
whether a payment transaction frequency of the first user is greater than or equal to a first preset frequency.

16. The computer-readable medium of claim 14, wherein the first information comprises the geographical region information,
wherein the first biometric database comprises a plurality of biometric information corresponding to a plurality of second users, each of the plurality of second users being associated with the geographical region and satisfying a second predetermined condition, and
wherein the second predetermined condition comprises at least one of:
whether a payment transaction quantity of a second user is greater than or equal to a second preset quantity; or
whether a payment transaction frequency of the second user is greater than or equal to a second preset frequency.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining biometric information from a user, wherein the biometric information comprises at least one of a facial feature, an iris feature, or a fingerprint;
obtaining, from the user, a geographical region associated with the user;
determining, from a plurality of biometric databases, one biometric database corresponding to the geographical region to be a first biometric database, wherein the first biometric database comprises a plurality of biometric information corresponding to a plurality of users associated with the geographical region;
determining that the obtained biometric information does not match any entry in the first biometric database;
in response to determining that the obtained biometric information does not match any entry in the first biometric database, determining that the obtained biometric information matches at least one entry in a second biometric database, wherein the second biometric database comprises a second number of entries greater than a first number of entries of the first biometric database;
in response to determining that the obtained biometric information matches at least one entry in the second biometric database, obtaining non-biometric verification information from the user;
determining that the non-biometric verification information matches at least a portion of preset non-biometric verification information associated with the user, wherein a length of the non-biometric verification information is less than a length of the preset non-biometric verification information; and
in response to determining that the non-biometric verification information matches at least a portion of the preset non-biometric verification information associated with the user, determining that an identity of the user is verified.

18. The computer-implemented system of claim 17, wherein the preset non-biometric verification information comprises at least one of a phone number of the user, an identification (ID) card information associated with the user, or a name of the user.

* * * * *